US012562646B2

(12) United States Patent
Kwon et al.

(10) Patent No.: US 12,562,646 B2
(45) Date of Patent: Feb. 24, 2026

(54) PARTIAL POWER CONVERTER

(71) Applicant: HUAWEI TECHNOLOGIES CO., LTD., Shenzhen (CN)

(72) Inventors: Yong Dae Kwon, Nuremberg (DE); Piniwan Thiwanka Bandara Wijekoon, Nuremberg (DE); Francisco Daniel Freijedo Fernández, Nuremberg (DE); Emanuel Vallarella, Nuremberg (DE); Roland Huempfner, Nuremberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 18/484,612

(22) Filed: Oct. 11, 2023

(65) Prior Publication Data

US 2024/0039408 A1     Feb. 1, 2024

Related U.S. Application Data

(63) Continuation of application No. PCT/EP2022/059231, filed on Apr. 7, 2022.

(30) Foreign Application Priority Data

Apr. 12, 2021    (WO) ................ PCT/EP2021/059418

(51) Int. Cl.
H02M 3/158 (2006.01)
H02M 1/00 (2006.01)
(52) U.S. Cl.
CPC ......... H02M 3/158 (2013.01); H02M 1/0093 (2021.05)
(58) Field of Classification Search
CPC ........................... H02M 3/158; H02M 1/0093
See application file for complete search history.

(56) References Cited

U.S. PATENT DOCUMENTS

| | | | |
|---|---|---|---|
| 2013/0200711 A1* | 8/2013 | Davies | .................. H10F 77/955 |
| | | | 307/77 |
| 2013/0294126 A1* | 11/2013 | Garrity | .................. H02M 7/46 |
| | | | 363/95 |

(Continued)

FOREIGN PATENT DOCUMENTS

| | | |
|---|---|---|
| WO | 2017089686 A1 | 6/2017 |

OTHER PUBLICATIONS

Zapata Jaime W et al:"Partial Power DC-DC Converter for Large-Scale Photovoltaic Systems", 2016 IEEE 2nd Annual Southern Power Electronics Conference (SPEC), Dec. 5, 2016, pp. 1-6, XP 033059590.

(Continued)

*Primary Examiner* — Rafael O De Leon Domenech

(57) ABSTRACT

The technology of this application relates to a partial power converter that is configured to be connected to at least one photovoltaic panel as inputs and a direct current output bus, the at least one photovoltaic panel generating a direct current. The partial power converter includes a photovoltaic-side converter comprising at least two switching cells, a bus-side converter comprising at least two switching cells, the bus-side converter being configured to switch a total current of the photovoltaic-side converter, an energy storage element connected between the photovoltaic-side converter and the bus-side converter, and an indirect voltage source configured to regulate the energy storage element. The photovoltaic-side converter, the bus-side converter and the energy storage element are connected in parallel between the first node and the second node of the partial power converter.

18 Claims, 13 Drawing Sheets

(56) References Cited

U.S. PATENT DOCUMENTS

| | | | |
|---|---|---|---|
| 2015/0076911 A1* | 3/2015 | Pape | H02J 3/381 |
| | | | 307/52 |
| 2015/0131328 A1* | 5/2015 | Tao | H02M 3/3376 |
| | | | 363/17 |
| 2019/0190392 A1* | 6/2019 | Pérez Leiva | H02M 3/22 |
| 2019/0280640 A1* | 9/2019 | Ganireddy | H02J 3/50 |
| 2019/0348903 A1* | 11/2019 | Yamada | H02M 7/219 |
| 2019/0363540 A1* | 11/2019 | Pan | H02M 3/155 |
| 2021/0351698 A1* | 11/2021 | Kouro Renaer | H02M 1/0095 |

OTHER PUBLICATIONS

International Search Report for PCT/EP2022/059231 dated Jul. 13, 2022, 16 pages.
Xue Fei et al: "Fractional converter for high efficiency high power battery energy storage system", 2017 IEEE Energy Conversion Congress and Exposition (ECCE), IEEE, Oct. 1, 2017, pp. 5144-5150.
Rivera Sebastian et al: "Pseudo-Partial-Power Converter without High Frequency Transformer for Electric Vehicle Fast Charging Stations", 2018 IEEE Energy Conversion Congress and Exposition (ECCE), IEEE, Sep. 23, 2018, pp. 1208-1213.
Sivakrishna K et al: "Differential Power-processing with Built-in Energy Storage for Multi-String Grid Interactive PV System", Dec. 16, 2020 (Dec. 16, 2020), pp. 1-6, XP033890201.
Zhu Yanping et al: "Partial Power Conversion and High Voltage RideThrough Scheme for a PV-Battery Based Multiport Multi-Bus Power Router", vol. 9, Jan. 14, 2021 (Jan. 14, 2021), pp. 17020-17029, XP011835099.

* cited by examiner

100b

700

701 controlling the switching cells of the photovoltaic-side converters and the bus-side converter to switch the Direct Current via the first current path or the second current path of the partial power converter in order to adjust a voltage across the partial power converter according to a power characteristic of the photovoltaic panel

Figure 8

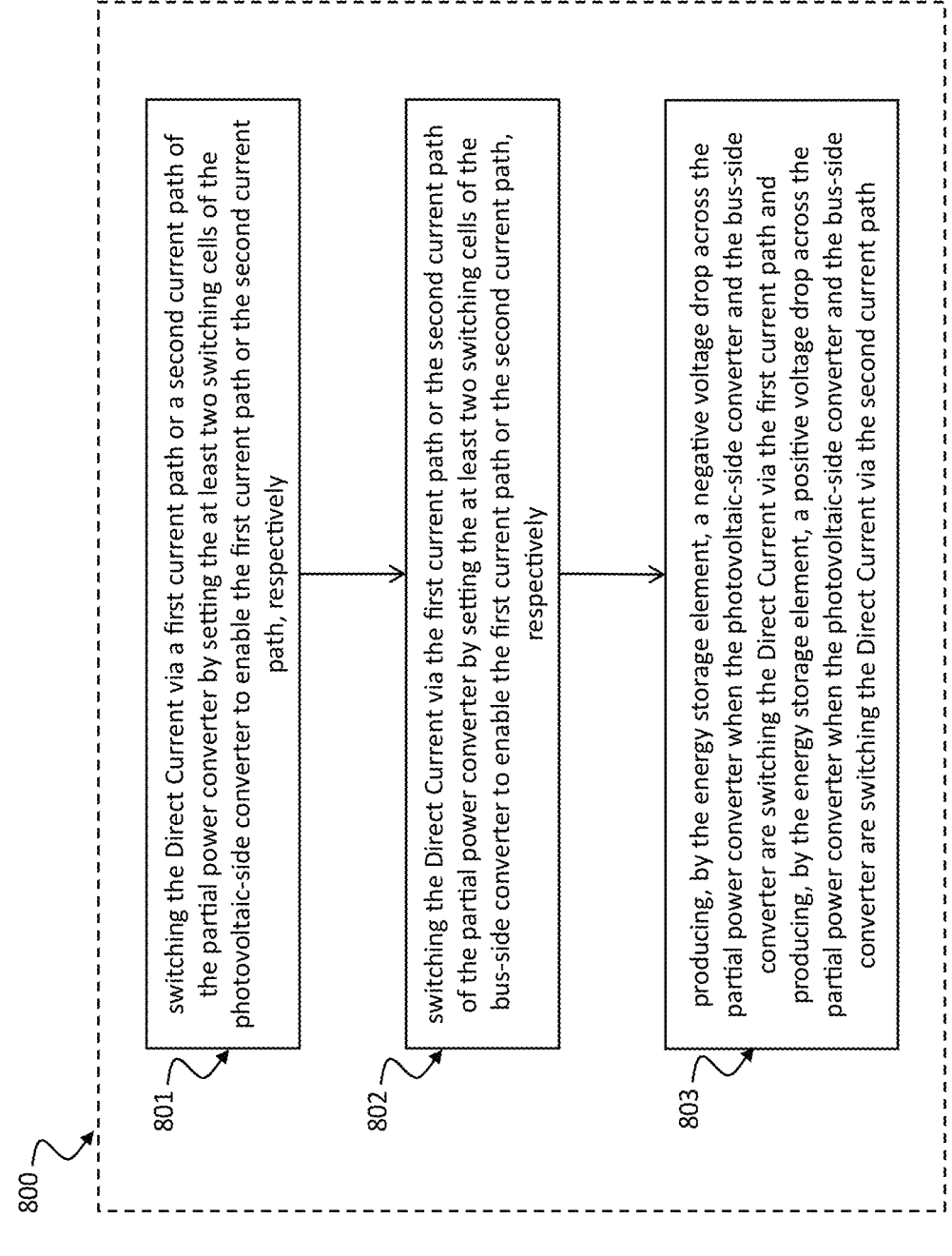

800

801  switching the Direct Current via a first current path or a second current path of the partial power converter by setting the at least two switching cells of the photovoltaic-side converter to enable the first current path or the second current path, respectively 802  switching the Direct Current via the first current path or the second current path of the partial power converter by setting the at least two switching cells of the bus-side converter to enable the first current path or the second current path, respectively 803  producing, by the energy storage element, a negative voltage drop across the partial power converter when the photovoltaic-side converter and the bus-side converter are switching the Direct Current via the first current path and producing, by the energy storage element, a positive voltage drop across the partial power converter when the photovoltaic-side converter and the bus-side converter are switching the Direct Current via the second current path

PARTIAL POWER CONVERTER

CROSS-REFERENCE TO RELATED APPLICATIONS

This application is a continuation of International Application No. PCT/EP2022/059231, filed on Apr. 7, 2022, which claims priority to International Application No. PCT/EP2021/059418, filed on Apr. 12, 2021. The disclosures of the aforementioned applications are hereby incorporated by reference in their entireties.

TECHNICAL FIELD

The present disclosure relates to a partial power converter and a method for partial power conversion. In particular, the disclosure relates to the field of circuit topology for DC/DC converters used in solar electrical energy conversion systems. Energy generated from solar panels are to be extracted efficiently by means of a Maximum Power Point Tracking (MPPT) circuitry & algorithm. this disclosure relates to such MPPT converter topology which converts DC energy from Solar panel to another form of DC energy efficiently.

BACKGROUND

Existing technologies for such MPPT DC/DC full power converters either use high voltage semiconductor devices or multiple of low voltage devices in series/parallel to form the converter circuitry, which increase the cost and reduce reliability. Secondly these applications are in need for higher efficiencies in terms of: Electrical efficiency (output power vs. input power); weight efficiency (output power vs. weight); and size efficiency (output power vs. size). Currently existing converter arrangements process the full power of the input source, in order to translate to output load. This is called the full power processing, which requires the full voltage and current rated semiconductor devices installed. These will increase cost, result in high losses and increase volume and weight.

SUMMARY

It is the object of this disclosure to provide a solution for a power converter in above described applications without the above described disadvantages.

In particular, it is the object of this disclosure to provide a power converter that is not required to process the full power of the input source, but only a partial power of the input source in order to decrease cost, loss, volume and weight.

This object is achieved by the features of the independent claims. Further implementation forms are apparent from the dependent claims, the description and the figures.

This disclosure describes a novel topology of a partial power DC/DC converter module which enables the use of low voltage, low cost semiconductor. In partial power processing, main power is directly delivered to the load, while a small portion of the power is processed by means of a power converter (i.e. partial power converter) in order to maintain the output voltage at a predefined level. In all input variations, this partial power converter operates on a smaller portion of the total power and therefore can be implemented by either low voltage or/and low current semiconductor devices. This disclosure describes such a partial power DC/DC converter.

Therefore, using such partial power converter as described hereinafter facilitates to improve the density and the cost of the MPPT converter in the photovoltaic (PV) architecture. Moreover, the high electrical efficiency can be achieved due to lower voltage semiconductor devices and by means of the integration of control and driving circuits in close proximity to the switching power cells, thereby minimizing delays and latencies in the control loop.

Further, a method for partial power conversion is presented that provides intelligent power sharing for a highly integrated, low component count partial power converter.

In order to describe the technology in detail, the following terms, abbreviations and notations will be used:

LV low voltage, e.g. up to about 250 V in DC
HV high voltage, e.g. higher than about 250 V in DC
DC direct current
AC alternating current
MPPT Maximum Power Point Tracking
PV photovoltaic
MOSFET Metal-Oxide Semiconductor Field Effect Transistor
EV electrical vehicle
UPS uninterruptible power supply
PWM Pulse Width Modulation
EL electrolumine scent
SoC state of charge In this disclosure, grids are described. Such a grid is an interconnected network for delivering or distributing electricity from producers to consumers. It may comprise generating stations that produce electric power, electrical substations for stepping electrical voltage up for transmission or down for distribution, high voltage transmission lines that carry power from distant sources to demand centers and distribution lines that connect individual customers.

Power converters, also referred to as power electronics converters, as described in this disclosure are applied for converting electric energy from one form to another, such as converting between DC and DC, e.g. between high or medium voltage DC and low voltage DC. Power converter can also change the voltage or frequency or some combination of these. Power electronics converter are based on power electronics switches that can be actively controlled by applying ON/OFF logic (i.e., PWM operation, usually commanded by a closed loop control algorithm).

Maximum Power Point Tracking (MPPT) is described in this disclosure. MPPT is a technique used commonly with photovoltaic (PV) solar systems to maximize power extraction under all conditions. PV solar systems exist in many different configurations with regard to their relationship to inverter systems, external grids, battery banks, or other electrical loads. Regardless of the ultimate destination of the solar power, the central problem addressed by MPPT is that the efficiency of power transfer from the solar cell depends on the amount of sunlight falling on the solar panels, the temperature of the solar panel and the electrical characteristics of the load. As these conditions vary, the load characteristic that gives the highest power transfer efficiency changes. The efficiency of the system is optimized when the load characteristic changes to keep the power transfer at highest efficiency. This load characteristic is called the maximum power point (MPP). MPPT is the process of finding this point and keeping the load characteristic there. Electrical circuits can be designed to present arbitrary loads to the photovoltaic cells and then convert the voltage, current, or frequency to suit other devices or systems, and MPPT solves the problem of choosing the best load to be presented to the cells in order to get the most usable power out.

A controller or controlling device as described in this disclosure is any device that can be utilized for regulation of voltage, currents or powers of a power electronics converter. A controller or controlling device can be a single micro-controller or processor or a multi-core processor or can include a set of micro-controllers or processors or can include means for controlling and/or processing. The controller can perform specific control tasks, for example controlling a converter, according to a software, hardware or firmware application.

In this disclosure, an indirect DC voltage source is described. Such an indirect DC voltage source can be a stiff DC voltage emulator, i.e. a device that provides a DC voltage at a predetermined level. The voltage can be indirectly provided, e.g. by using one or more DC sources which DC voltage levels are DC/DC converted to a desired DC voltage level of the indirect DC voltage source.

According to a first aspect, the disclosure relates to a partial power converter that is configured to be connected to at least one photovoltaic panel as inputs and a direct current output bus, the at least one photovoltaic panel generating a direct current, the partial power converter comprising: a photovoltaic-side converter comprising at least two switching cells, wherein the photovoltaic-side converter comprises a first terminal connected to a first node, a second terminal connected to a second node and a third terminal that is configured to connect the partial power converter to the at least one photovoltaic panel; a bus-side converter comprising at least two switching cells, the bus-side converter being configured to switch a total Current of the photovoltaic-side converter, wherein the bus-side converter comprises a first terminal connected to the first node, a second terminal connected to the second node and a third terminal that is configured to connect the direct current output bus; an energy storage element connected between the photovoltaic-side converter and the bus-side converter; and an indirect voltage source configured to regulate the energy storage element, wherein the photovoltaic-side converter, the bus-side converter and the energy storage element are connected in parallel between the first node and the second node of the partial power converter.

The direct current $I_L$ generated by the photovoltaic panels is fed to the partial power converter. A total current $I_{tot}$ of the photovoltaic-side converter is the sum of all currents generated by the photovoltaic panels: $I_{tot}=I_{L1}+I_{L2}+I_{L3}+I_{L4}$. This total current flows through the bus-side converter.

Such a partial power converter provides the technical advantage that its operation is based on processing only the minimal amount of partial power. The partial power converter thus improves overall efficiency and power density. MPPT of each input may be achieved based on maximum average output voltage.

In the above partial power converter, no bulky energy storage elements are required. The partial power converter is highly integrated and scalable for multiple MPPT strings. The stiff DC voltage emulator, i.e. the indirect voltage source, enables utilization of the partial power converter to the other devices such as battery charger.

The partial power converter may be advantageously applied to DC/DC MPPT converters which are used for solar string inverters. The partial power converter may further be advantageously applied for partial power sharing with battery charger, UPS, EV or similar applications.

In an exemplary implementation of the partial power converter, the energy storage element comprises a buffer capacitor.

This provides the advantage that a buffer capacitor can be easily implemented and can efficiently store electrical energy.

In an exemplary implementation of the partial power converter, the first current path is arranged between the second node and the first node of the partial power converter; and the second current path is arranged between the first node and the second node of the partial power converter.

This provides the advantage that the partial power converter can easily switch between the first current path and the second current path.

In an exemplary implementation of the partial power converter, the partial power converter comprises: at least one further photovoltaic-side converter comprising a first terminal connected to the first node, a second terminal connected to the second node and a third terminal that can be connected to at least one further photovoltaic panel.

This provides the advantage that the partial power converter can flexibly connected to multiple photovoltaic panels to flexibly convert their currents. Hence, high powers can be converted by the partial power converter.

n an exemplary implementation of the partial power converter, the switching elements of the photovoltaic-side converter are arranged to form a 2-level leg or multilevel leg.

A multilevel leg may have 3 levels or more. The 3-level leg may be a neutral point clamping 3-level leg or a flying capacitor 3-level leg or similar This provides the advantage that the photovoltaic-side converter can flexibly designed based on switching requirements.

In an exemplary implementation of the partial power converter, the switching elements of the bus-side converter are arranged to form a 2-level leg or a multilevel leg.

A multilevel leg may have 3 levels or more. The 3-level leg may be a neutral point clamping 3-level leg or a flying capacitor 3-level leg or similar This provides the advantage that the bus-side converter can flexibly designed based on switching requirements.

n an exemplary implementation of the partial power converter, the photovoltaic-side converter comprises an inductor configured to receive the direct current from the photovoltaic panel.

This provides the advantage that the inductor enables passing DC currents but blocks high frequency components of the currents from the photovoltaic panels.

In an exemplary implementation of the partial power converter, the partial power converter comprises a controller, wherein the controller is configured to control the switching cells of the photovoltaic-side converter and the bus-side converter to adjust the voltage across the partial power converter based on a duty cycle of the partial power converter.

This provides the advantage that the controller can efficiently control the partial power converter, e.g. based on pulse-width modulation switching.

In an exemplary implementation of the partial power converter, the controller is configured to adjust the voltage across the partial power converter to a value of $(1-2D)V_p$ in order to synthesize a voltage Vin generated by the photovoltaic panel 140 according to the equation $Vin=(1-2D)V_p+Vbus$, wherein Vin is the voltage generated by the photovoltaic panel, Vp is the voltage across the energy storage element, Vbus is the voltage across the DC bus and D is the duty cycle of the partial power converter.

This provides the advantage that the controller can efficiently adjust the voltage across the partial power converter depending on a current delivered by the photovoltaic panels.

In an exemplary implementation of the partial power converter, the controller is configured to adjust the voltage across the partial power converter according to a Maximum Power Point Tracking characteristic of the photovoltaic panel.

This provides the advantage that the controller can optimally adjust the voltage across the partial power converter based on the MPPT criterion.

n an exemplary implementation of the partial power converter, the third terminal of the photovoltaic-side converter is configured to connect the partial power converter to at least one battery energy storage.

This provides the advantage that such partial power converter is capable of supporting the integration of battery energy storage elements with PV string without any additional hardware components.

In an exemplary implementation of the partial power converter, the controller is configured to adjust the voltage across the partial power converter according to a state of charge of the at least one battery energy storage.

This provides the advantage that such a controller can operate both with MPPT for PV operation and SOC algorithms to support battery management capability.

In an exemplary implementation of the partial power converter, the third terminal of the at least one further photovoltaic-side converter is configured to connect the partial power converter to either the at least one further photovoltaic panel or to at least one further battery energy storage or to both.

This provides the advantage of high flexibility since the partial power converter can connect to the PV panels, the battery energy storages or both of them. Existing hardware can be used for this configuration, no additional DC/DC conversion is required for connecting the battery energy storage.

n an exemplary implementation of the partial power converter, the third terminal of the photovoltaic-side converter is configured to provide an electroluminescent current to the at least one photovoltaic panel for recording an electroluminescent image of the at least one photovoltaic panel.

This provides the advantage that the partial power converter can be efficiently used for supervising the PV panels, e.g., at night when electroluminescent images of the PV panels can be recorded, e.g., by a drone.

In an exemplary implementation of the partial power converter, a current flow direction of the electroluminescent current is opposite to a current flow direction of a current generated by the at least one photovoltaic panel.

This provides the advantage that the current generated by the PV panels can be used for power generation and without any hardware changes, the partial power converter is capable of providing electroluminescent current for checking the PV panels.

In an exemplary implementation of the partial power converter, the third terminal of the photovoltaic-side converter is configured to enable a current flow in both directions. This provides the advantage that no additional switch is required for changing the current flow direction when switching from power generation mode to testing mode.

According to a second aspect, the disclosure relates to a partial power system, comprising: a photovoltaic panel configured to generate an input voltage; a direct current bus configured to receive a bus voltage; and a partial power converter according to the first aspect described above, connected between the photovoltaic panel and the direct current bus in series, wherein the partial power system is configured to partition the input voltage generated by the photovoltaic panel into the voltage across the partial power converter and the bus voltage across the direct current bus.

Such a partial power system provides the technical advantage that its operation is based on processing only the minimal amount of partial power. The partial power system thus improves overall efficiency and power density. MPPT of each input may be achieved based on maximum average output voltage.

In an exemplary implementation of the partial power system, the indirect voltage source comprises a battery configured to regulate the voltage drop across the partial power converter via a DC/DC converter.

This provides the advantage that the battery can be used to efficiently regulate the voltage drop across the partial power converter. The battery thus represents an efficient stiff DC voltage emulator holding the DC voltage to a predetermined value.

In an exemplary implementation of the partial power system, the indirect voltage source comprises a direct current source configured to regulate a voltage drop across the partial power converter via an isolated DC/DC converter.

This provides the advantage that the DC source together with the isolated DC/DC converter can be used to efficiently regulate the voltage drop across the partial power converter. The DC source together with the isolated DC/DC converter thus represents an efficient stiff DC voltage emulator holding the DC voltage to a predetermined value.

In an exemplary implementation of the partial power system, the direct current source is connected to the direct current bus to receive the bus voltage.

This provides the advantage that the direct current source can efficiently receive the bus voltage.

In an exemplary implementation of the partial power system, the direct current bus is connected via a DC/AC converter to an electric power distribution network.

This provides the advantage that the converted power of the solar panels can be efficiently passed to an electric power distribution network.

In an exemplary implementation of the partial power system, the partial power converter is constructed based on low voltage semiconductor devices.

Low voltage means here voltages between 0 and about 250V, while medium or high voltage means voltages between about 250V and about 1500V or higher.

This provides the advantage that low cost semiconductor devices, e.g. MOSFETs can be efficiently applied for the conversion.

In an exemplary implementation of the partial power system, the partial power system further comprises at least one battery energy storage configured to store an energy provided by the partial power converter.

This provides the advantage that the PV panels can be operated together with the battery energy storages without the need of any hardware change.

According to a third aspect, the disclosure relates to a partial power converter that is configured to be connected to one or multiple photovoltaic panels as inputs and a direct current output bus, the photovoltaic panels generating a direct current, the partial power converter comprising: a photovoltaic-side converter per photovoltaic panel, each photovoltaic-side converter comprising at least two switching cells, the photovoltaic-side converter being configured to switch the direct current via a first current path or a second current path of the partial power converter by setting the at least two switches to enable the first current path or the second current path, respectively; a bus-side converter comprising at least two switching cells, the bus-side converter being configured to switch the direct current via the first current path or the second current path of the partial power converter by setting the at least two switches to enable the first current path or the second current path, respectively; an energy storage element connected between the photovoltaic-side converters and the bus-side converter, wherein the energy storage element is configured to produce a negative voltage drop across the partial power converter when the photovoltaic-side converter and the bus-side converter are configured to switch the direct current via the first current path and to produce a positive voltage drop across the partial power converter when the photovoltaic-side converter and the bus-side converter are configured to switch the direct current via the second current path; and a controller, configured to control the switching cells of the photovoltaic-side converter and the bus-side converter to switch the direct current via the first current path or the second current path of the partial power converter in order to adjust a voltage across the partial power converter according to a power characteristic of the photovoltaic panel.

Such a partial power converter provides the technical advantage that its operation is based on processing only the minimal amount of partial power. The partial power converter thus improves overall efficiency and power density. MPPT of each input may be achieved based on maximum average output voltage.

According to a fourth aspect, the disclosure relates to a method for controlling a partial power converter, the partial power converter being configured to be connected to one or multiple photovoltaic panels as inputs and a direct current output bus, the photovoltaic panels generating a direct current, the partial power converter comprising: a photovoltaic-side converter per photovoltaic panel, each photovoltaic-side converter comprising at least two switching cells, the photovoltaic-side converter being configured to switch the direct current via a first current path or a second current path of the partial power converter by setting the at least two switches to enable the first current path or the second current path, respectively; a bus-side converter comprising at least two switching cells, the bus-side converter being configured to switch the direct current via the first current path or the second current path of the partial power converter by setting the at least two switches to enable the first current path or the second current path, respectively; an energy storage element connected between the photovoltaic-side converter and the bus-side converter, wherein the energy storage element is configured to produce a negative voltage drop across the partial power converter when the photovoltaic-side converter and the bus-side converter are configured to switch the direct current via the first current path and to produce a positive voltage drop across the partial power converter when the photovoltaic-side converter and the bus-side converter are configured to switch the direct current via the second current path; wherein the method comprises: controlling the switching cells of the photovoltaic-side converters and the bus-side converter to switch the direct current via the first current path or the second current path of the partial power converter in order to adjust a voltage across the partial power converter according to a power characteristic of the photovoltaic panel.

Such a method for controlling a partial power converter provides the technical advantage that it enables operation of the partial power converter based on processing only the minimal amount of partial power. The method thus improves overall efficiency and power density. MPPT of each input may be achieved based on maximum average output voltage.

According to a fifth aspect, the disclosure relates to a method for controlling a partial power converter that is configured to be connected to at least one photovoltaic panel as inputs and a direct current output bus, the at least one photovoltaic panel generating a direct current, the partial power converter comprising: a photovoltaic-side converter comprising at least two switching cells, wherein the photovoltaic-side converter comprises a first terminal connected to a first node, a second terminal connected to a second node and a third terminal that is configured to connect the partial power converter to the at least one photovoltaic panel; a bus-side converter comprising at least two switching cells, the bus-side converter being configured to switch a total current of the photovoltaic-side converter, wherein the bus-side converter comprises a first terminal connected to the first node, a second terminal connected to the second node and a third terminal that is configured to connect the direct current output bus; an energy storage element connected between the photovoltaic-side converter and the bus-side converter; and an indirect voltage source configured to regulate the energy storage element, wherein the photovoltaic-side converter, the bus-side converter and the energy storage element are connected in parallel between the first node and the second node of the partial power converter, the method comprising: switching the direct current via a first current path or a second current path of the partial power converter by setting the at least two switching cells of the photovoltaic-side converter to enable the first current path or the second current path, respectively; switching the direct current via the first current path or the second current path of the partial power converter by setting the at least two switching cells of the bus-side converter to enable the first current path or the second current path, respectively; producing, by the energy storage element, a negative voltage drop across the partial power converter when the photovoltaic-side converter and the bus-side converter are switching the direct current via the first current path and producing, by the energy storage element, a positive voltage drop across the partial power converter when the photovoltaic-side converter and the bus-side converter are switching the direct current via the second current path.

Such a method for controlling a partial power converter provides the technical advantage that it enables operation of the partial power converter based on processing only the minimal amount of partial power. The method thus improves overall efficiency and power density. MPPT of each input may be achieved based on maximum average output voltage.

According to a sixth aspect, the disclosure relates to a computer program product including computer executable code or computer executable instructions that, when executed, causes at least one computer to execute the method according to the fourth or fifth aspect described above.

The computer program product may run on a controller for controlling the above described partial power converters, e.g. a controller as shown in FIGS. 1a and 2a.

According to a seventh aspect, the disclosure relates to a computer-readable medium, storing instructions that, when executed by a computer, cause the computer to execute the method according to the fourth or fifth aspect described above. Such a computer readable medium may be a non-transient readable storage medium. The instructions stored on the computer-readable medium may be executed by the controller as described in FIGS. 1a and 2a.

The architecture presented in this disclosure for a partial power converter provides the following advantages:

1) Single partial power converter hardware for both:
    i) MPPT (Maximum Power Point Tracking) of the solar PV string,
    ii) SoC (State of charge) of the battery storage;
2) Battery can be charged both from the PV and grid with the same converter hardware;
3) Capability for mix and match battery and MPPT inputs with only software switch;
4) high efficiency due to partial power concept;
5) low cost;
6) highly scalable to system needs.

BRIEF DESCRIPTION OF THE DRAWINGS

Further embodiments of the technology will be described with respect to the following figures, in which:

FIG. 8 shows an example schematic diagram illustrating a method 800 for controlling a partial power converter according to the disclosure;

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless noted otherwise.

Figure 1A:
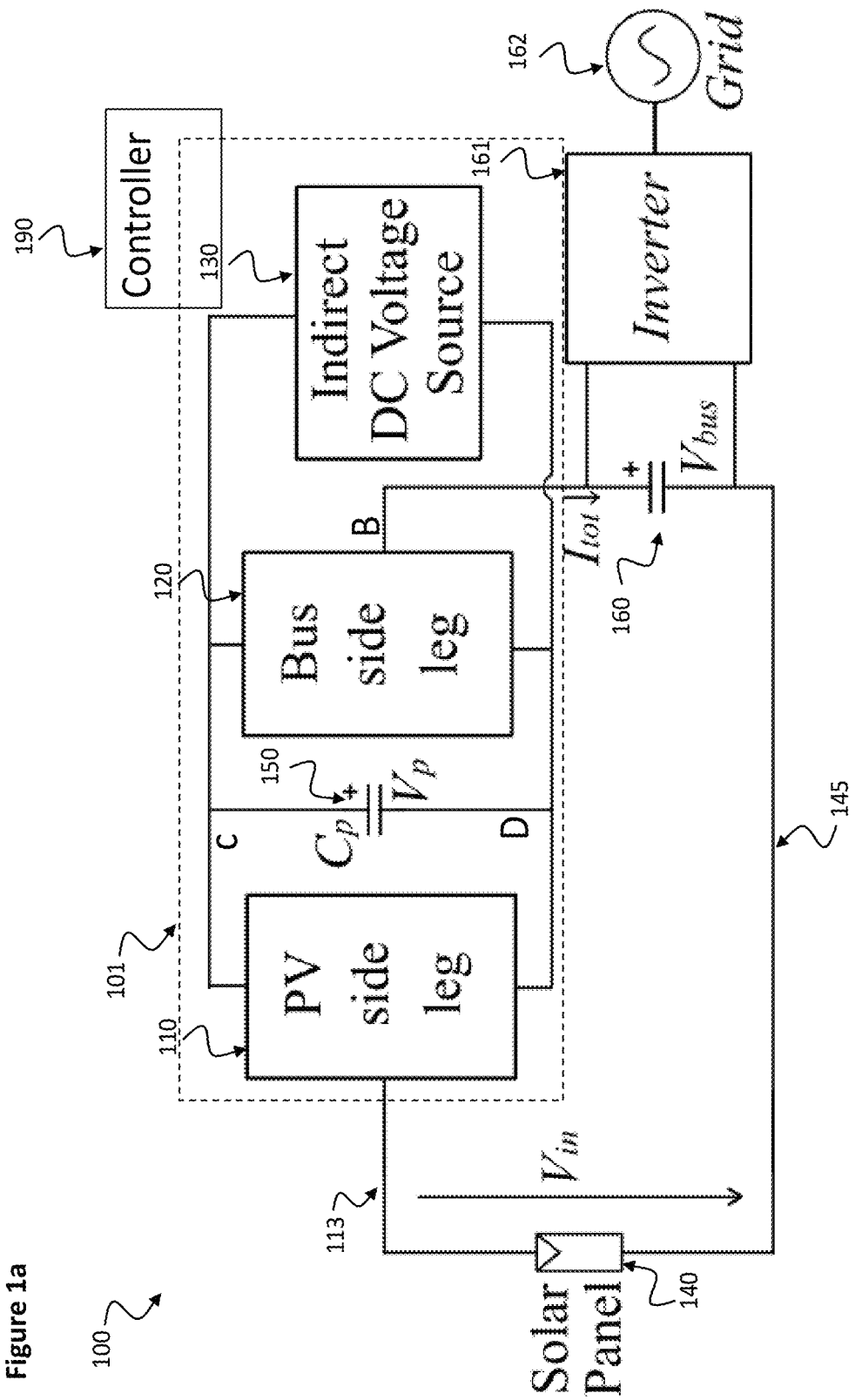
FIG. 1a shows a block diagram illustrating an exemplary partial power conversion system 100 with a partial power converter 100 according to the disclosure connected to a single solar panel 140.

FIG. 1a shows a block diagram illustrating an exemplary partial power conversion system 100 with a partial power converter 100 according to the disclosure connected to a single solar panel 140.

The partial power converter 100 introduces a novel partial power converter topology and control mechanism (mentioned as "converter") used in Solar PV electrical energy conversion applications. The converter 100 translates DC electrical power generated from one or more solar panels to another form of DC electrical power. The partial power converter 100 shown in FIG. 1 is connected to a single solar panel 140, but may also be connected to multiple such solar panels as shown in FIG. 2a. The partial power converter 100 consists of three parts as shown in FIG. 1, which are PV side leg(s) 110; buffer capacitor 150 or similar energy storage element; and bus side leg 120.

PV side leg(s) of the converter 100 are directly connected to one or multiple of solar panels 140 or strings. Many panels may be arranged in series or parallel. The bus side leg 120 of the converter 100 will be connected to the DC bus 160 of a DC/AC inverter 161 which translates the DC power to AC power or to a DC transmission system or to a solid state transformer or to a DC load of a grid 162. Lastly, the buffer capacitor 150 is placed between PV side leg 110 and bus side leg 120.

As shown in FIG. 1a, the single partial power converter 100 is placed in series to the Solar Panel/String 140, i.e. several panels 140 connected in series to form a 'String', and the output DC bus 160. This single converter unit 101 is in series with the incoming DC current source, in this case the solar panel(s) 140. The bus side leg 120 is connected to the output DC bus 160 such as in this example a DC/AC inverter

161. Between the PV side leg 110 and bus side leg 120, there is a buffer capacitor (C<sub>p</sub>) 150.

The stiff DC emulator 130 is maintaining stiff the DC link voltage V<sub>p</sub> of the partial power converter unit 101 and makes partial power converter feasible to track maximum power point of all the different PV strings 140. The PV side leg 110 of the partial power converter function is to add or subtract additional voltage buffer in the capacitor V<sub>p</sub> from the voltage V<sub>bus</sub>, where necessary and conducting MPPT current.

In the following, the partial power converter 101 is described in more detail.

The partial power converter 101 is configured to be connected to at least one photovoltaic panel 140, 141 (as shown at least in FIGS. 1a and 2a) as inputs and a direct current output bus 160. The at least one photovoltaic panel 140 is generating a direct current I<sub>L</sub>.

The partial power converter 101 comprises: a photovoltaic-side converter 110, also referred to as PV side leg, a bus-side converter 120, also referred to as bus side leg, an energy storage element 150 and an indirect voltage source 130.

The photovoltaic-side converter 110 comprises at least two switching cells 111, 112, as shown in FIG. 2a. The photovoltaic-side converter 110 comprises a first terminal connected to a first node C, a second terminal connected to a second node D and a third terminal 113 that is configured to connect the partial power converter 101 to the at least one photovoltaic panel 140.

The bus-side converter 120 comprises at least two switching cells 121, 122, as shown in FIG. 2a. The bus-side converter 120 is configured to switch a total Current I<sub>tot</sub> of the photovoltaic-side converter 110. The total current I<sub>tot</sub> corresponds to the sum of currents generated by the solar panels 140; in FIG. 1 there is only a single solar panel generating the current I<sub>L</sub>, such that the total current I<sub>tot</sub> corresponds to the current I<sub>L</sub>. The bus-side converter 120 comprises a first terminal connected to the first node C, a second terminal connected to the second node D and a third terminal that is configured to connect the direct current output bus 160.

The energy storage element 150 is connected between the photovoltaic-side converter 110 and the bus-side converter 120.

The indirect voltage source 130 is configured to regulate the energy storage element 150.

The photovoltaic-side converter 110, the bus-side converter 120 and the energy storage element 150 are connected in parallel between the first node C and the second node D of the partial power converter 101.

The partial power converter 101 may comprise a controller 190. The controller 190 may be configured to control the switching cells of the photovoltaic-side converter 110 and the bus-side converter 120 to adjust the voltage across the partial power converter 101 based on a duty cycle of the partial power converter 101.

For example, the controller 190 may be configured to adjust the voltage across the partial power converter 101 to a value of (1−2D)Vp in order to synthesize a voltage Vin generated by the photovoltaic panel 140 according to the equation Vin=(1−2D)Vp+Vbus.

Vin is the voltage generated by the photovoltaic panel 140, Vp is the voltage across the energy storage element 150, Vbus is the voltage across the DC bus 160 and D is the duty cycle of the partial power converter 101.

The controller 190 may be configured to adjust the voltage across the partial power converter 101 according to a Maximum Power Point Tracking characteristic of the photovoltaic panel 140.

The partial power system 100 shown in FIG. 1 comprises: a photovoltaic panel 140 configured to generate an input voltage Vin; a direct current bus 160 configured to receive a bus voltage Vbus; and the partial power converter 101 described above, connected between the photovoltaic panel 140 and the direct current bus 160 in series.

The partial power system 100 is configured to partition the input voltage Vin generated by the photovoltaic panel 140 into the voltage across the partial power converter 101 and the bus voltage Vbus across the direct current bus 160.

Figure 1B:
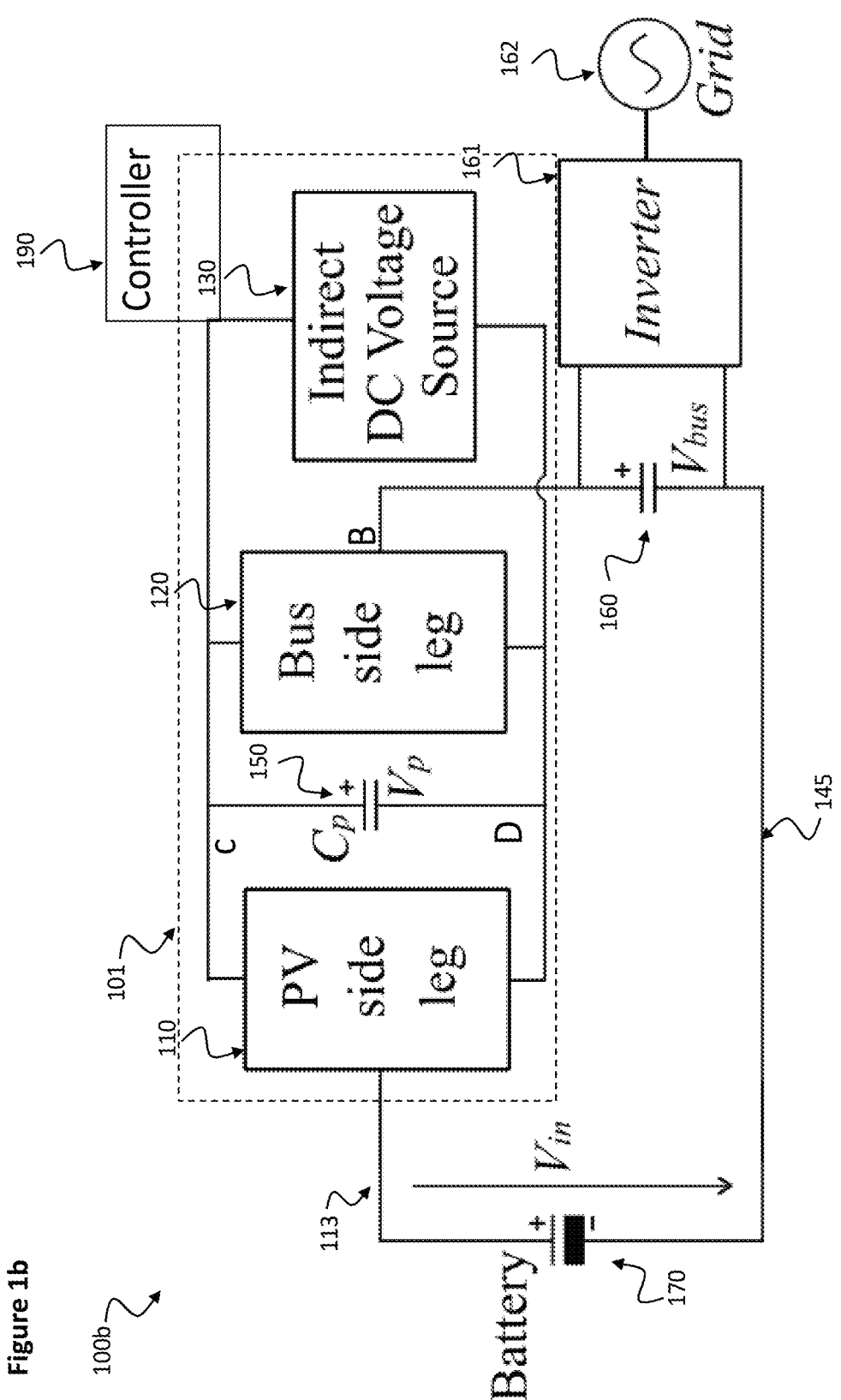
FIG. 1b shows a block diagram illustrating an exemplary partial power conversion system 100b with a partial power converter 101 according to the disclosure connected to a battery energy storage 170.
Figure 2A:
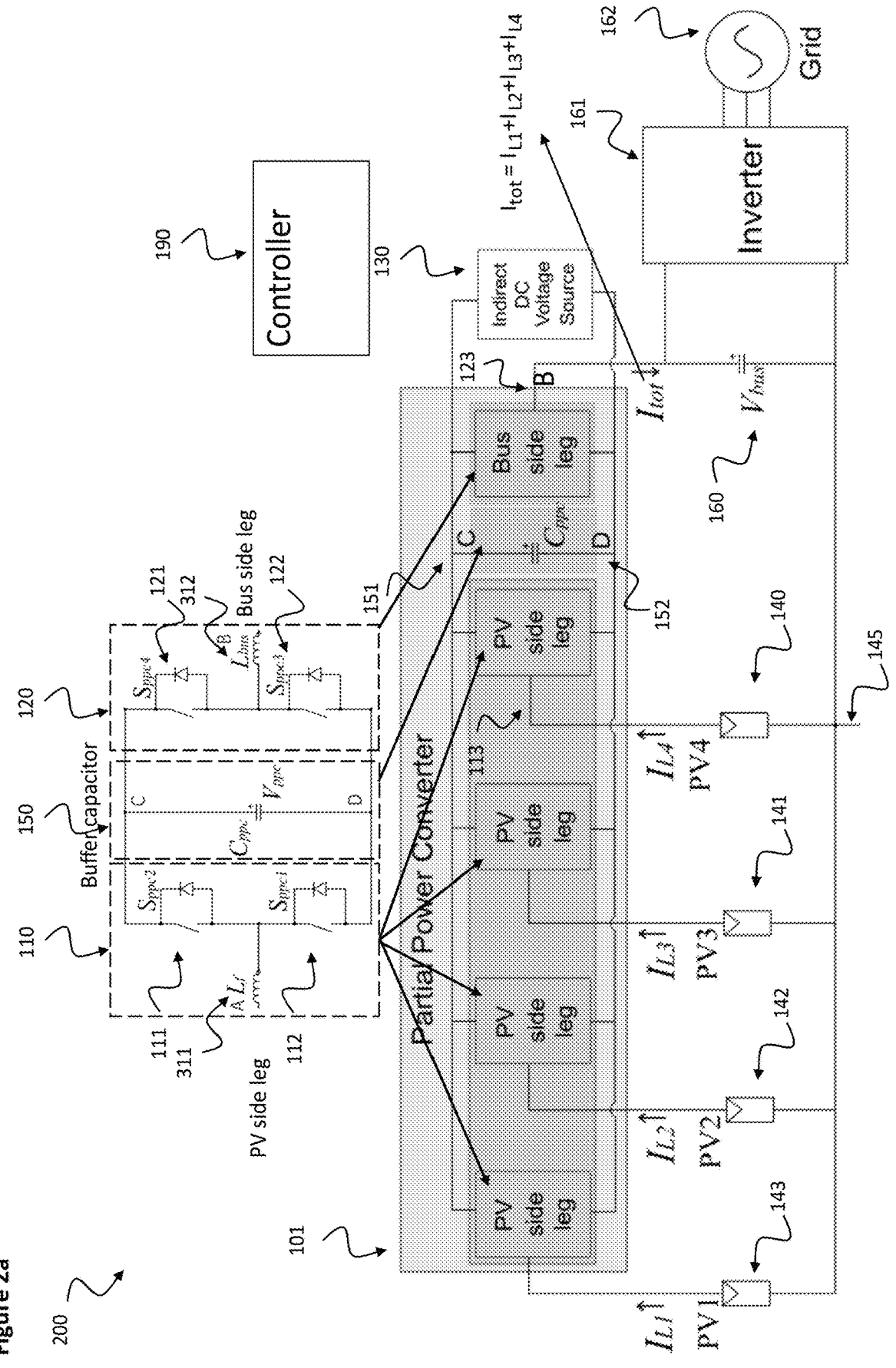
FIG. 2a shows a block diagram illustrating an exemplary partial power conversion system 200 with a partial power converter 101 according to the disclosure connected to multiple solar panels 140, 141, 142, 143.

FIG. 1b shows a block diagram illustrating an exemplary partial power conversion system 100b with a partial power converter 101 according to the disclosure connected to a battery energy storage 170.

The partial power conversion system 100b corresponds to the partial power conversion system 100 described above with respect to FIG. 1a. However, in contrast to FIG. 1a, the partial power converter 101 is not connected to the photovoltaic panel 140 but to a battery energy storage 170.

The battery energy storage 170 may be configured to store an energy provided by the partial power converter 101.

In particular, the third terminal 113 of the photovoltaic-side converter 110 can connect the partial power converter 101 to the battery energy storage 170. The current I<sub>L</sub> at the third terminal 113 can flow in both directions. For example, when charging the battery energy storage 170, the current I<sub>L</sub> can flow from the partial power converter 101 to the battery energy storage 170 and when using energy from the battery energy storage 170, the current I<sub>L</sub> can flow in opposite direction.

The controller 190 may be configured to adjust the voltage across the partial power converter 101 according to a state of charge of the battery energy storage 170. For example, when the battery energy storage 170 is at a low charging level, the controller 190 can adjust the voltage across the partial power converter 101 to a high level; while when the battery energy storage 170 is at a high charging level, the controller 190 can adjust the voltage across the partial power converter 101 to a low level.

FIG. 2a shows a block diagram illustrating an exemplary partial power conversion system 200 with a partial power converter 101 according to the disclosure connected to multiple solar panels 140, 141, 142, 143.

The partial power converter 101 corresponds to the partial power converter 101 described above with respect to FIG. 1a. However, in FIG. 2a, the partial power converter 101 is configured to be connected to multiple photovoltaic panels 140, 141, 142, 143 as inputs and the Direct Current output bus 160. In FIG. 2 an exemplary number of four photovoltaic panels 140, 141, 142, 143 are shown. However, any other number of photovoltaic panels can be connected to the partial power converter 1010. The multiple photovoltaic panels 140, 141, 142, 143 are generating respective direct currents I<sub>L1</sub>, I<sub>L2</sub>, I<sub>L3</sub>, I<sub>L4</sub> fed to the respective PV side legs of the photovoltaic-side converter 110.

The PV side legs 110 may conduct MPPT for each PV string 140, 141, 142, 143 with low voltage MOSFETs, e.g. 150V MOSFETs. The PV side legs switch at relatively low frequency.

The bus side leg 120 may consist of low voltage MOSFETs. The bus side leg 120 may be configured to inject power to the bus 160 between inverter 161. The bus side leg 120 may be configured to switch at relatively low frequency.

The indirect DC voltage source 130 that serves as voltage regulator is connected between the nodes C and D of the partial power converter 101. The inverter 161 is connected to inductor 312 of node B.

The indirect DC voltage source 130 may be configured to exchange the energy between a battery connected via nodes E, F to the indirect DC voltage source 130 (not shown in FIG. 2a) and the parallel partial power converter 101. The indirect DC voltage source 130 may be configured to manipulate stiff voltage condition of buffer capacitor 150 and current path for redundant power in multi-PV-string architecture 200 shown in FIG. 2.

The bus-side converter 120 is configured to switch a total Current $I_{tot}$ of the photovoltaic-side converter 110. The total current $I_{tot}$ corresponds to the sum of currents generated by the solar panels 140, 141, 142, 143, i.e. $I_{tot}=I_{L1}+I_{L2}+I_{L3}+I_{L4}$.

The energy storage element 150 may comprise a buffer capacitor as shown in FIG. 2.

The partial power converter 101 may comprise multiple photovoltaic-side converters 110 corresponding to the number of solar panels 140, 141, 142, 143 connected to the partial power converter 101. Each photovoltaic-side converters 110 may comprise a first terminal connected to the first node 151, C, a second terminal connected to the second node 152, D and a third terminal that can be connected to the respective photovoltaic panel 140, 141, 142, 143.

Figure 4:
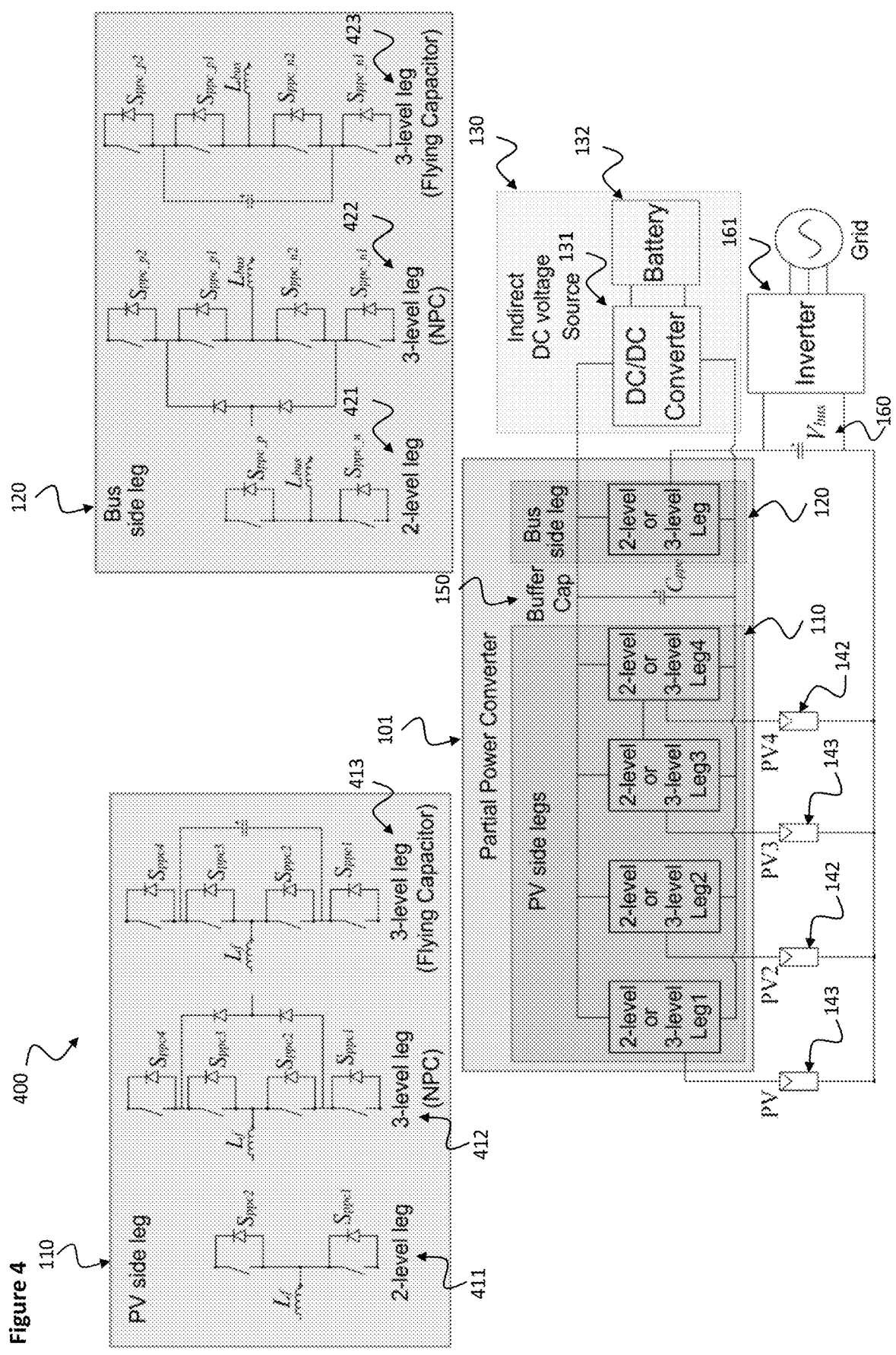
FIG. 4 shows a block diagram illustrating a partial power conversion system 400 according to a first example, applied in a residential solar PV inverter.
Figure 5:
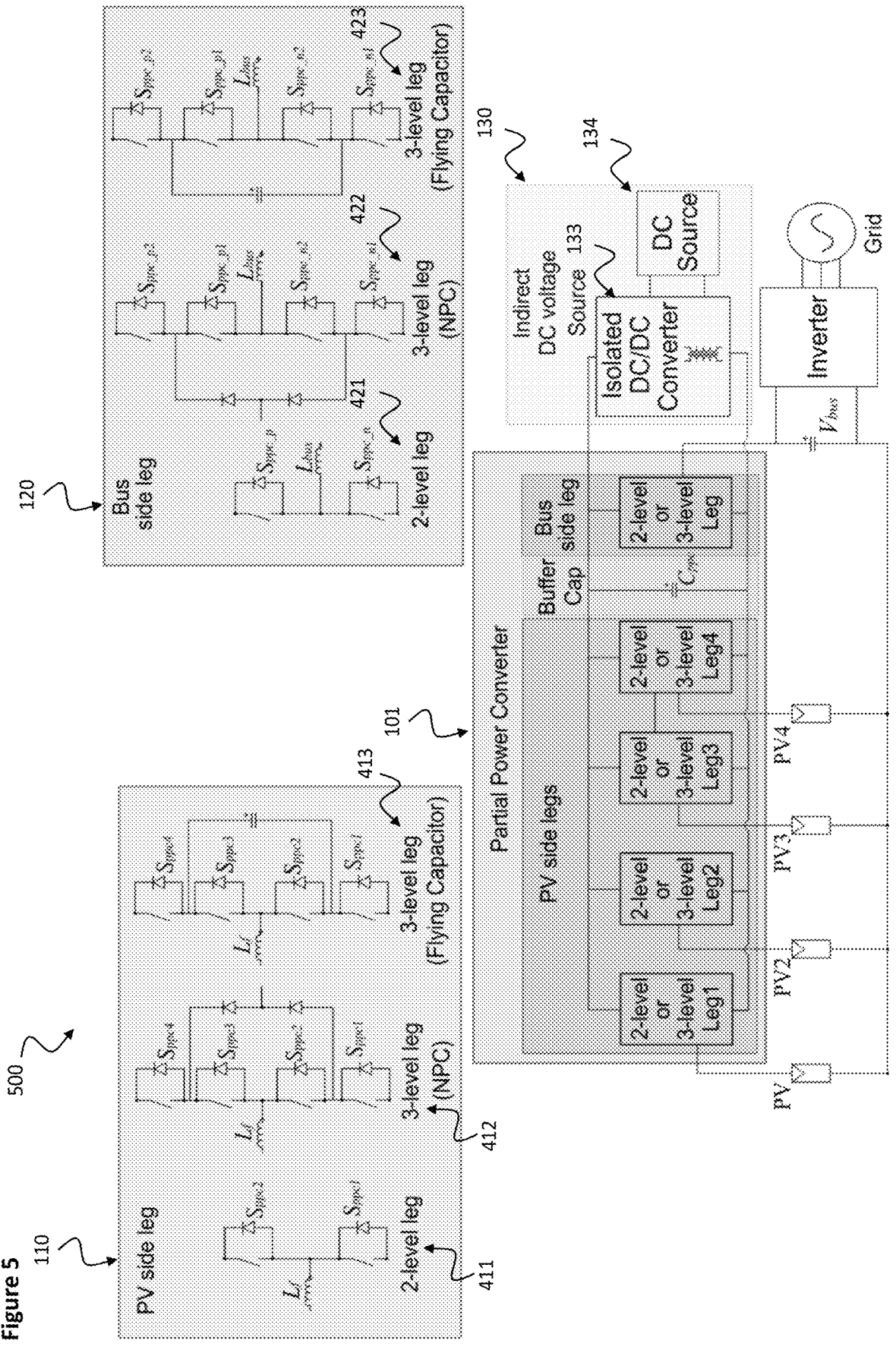
FIG. 5 shows a block diagram illustrating a partial power conversion system 500 according to a second example, applied in a residential solar PV inverter.
Figure 6:
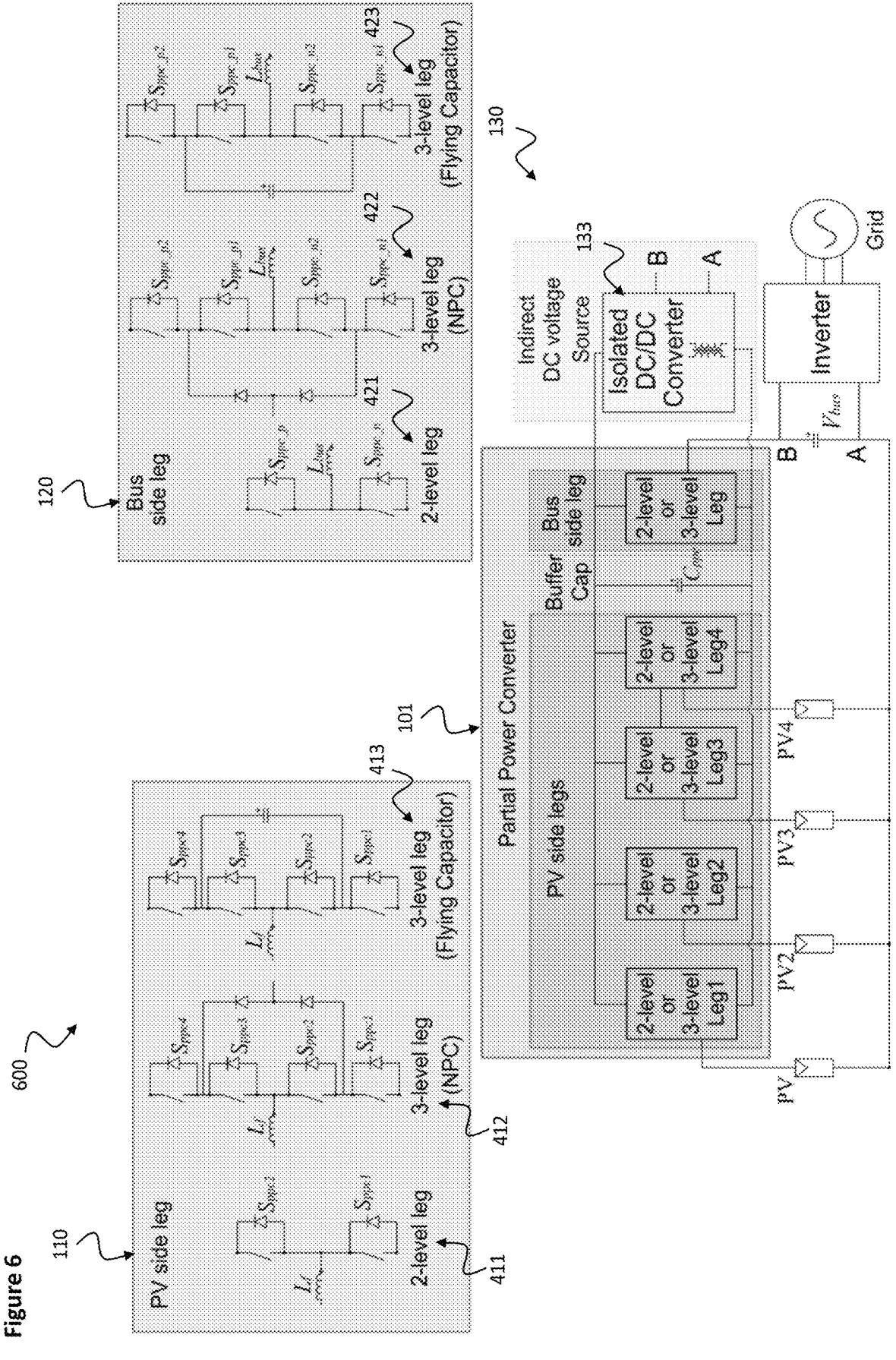
FIG. 6 shows a block diagram illustrating a partial power conversion system 600 according to a third example, applied in a residential solar PV inverter.

The switching elements of the photovoltaic-side converter 110 may be arranged to form a 2-level leg or multilevel leg, e.g. as shown in FIGS. 4 to 6.

The switching elements of the bus-side converter 120 may be arranged to form a 2-level leg or a multilevel leg, e.g. as shown in FIGS. 4 to 6.

The photovoltaic-side converter 110 may comprise an inductor 311 that may be configured to receive the direct current $I_{L1}$, $I_{L2}$, $I_{L3}$, $I_{L4}$ from the respective photovoltaic panel 140, 141, 142, 143.

The bus-side converter 120 may comprise an inductor 312 that may be configured to provide the direct current $I_{tot}$ to the bus 160.

In the following, operation of the partial power converter 101 shown in FIG. 2a is described in more detail.

The partial power converter 101 is configured to be connected to one or multiple photovoltaic panels 140, 141, 142, 143 as inputs and a Direct Current output bus 160. The photovoltaic panels 140, 141, 142, 143 are generating respective direct currents $I_{L1}$, $I_{L2}$, $I_{L3}$, $I_{L4}$.

Figures 3A, 3B, 3C:
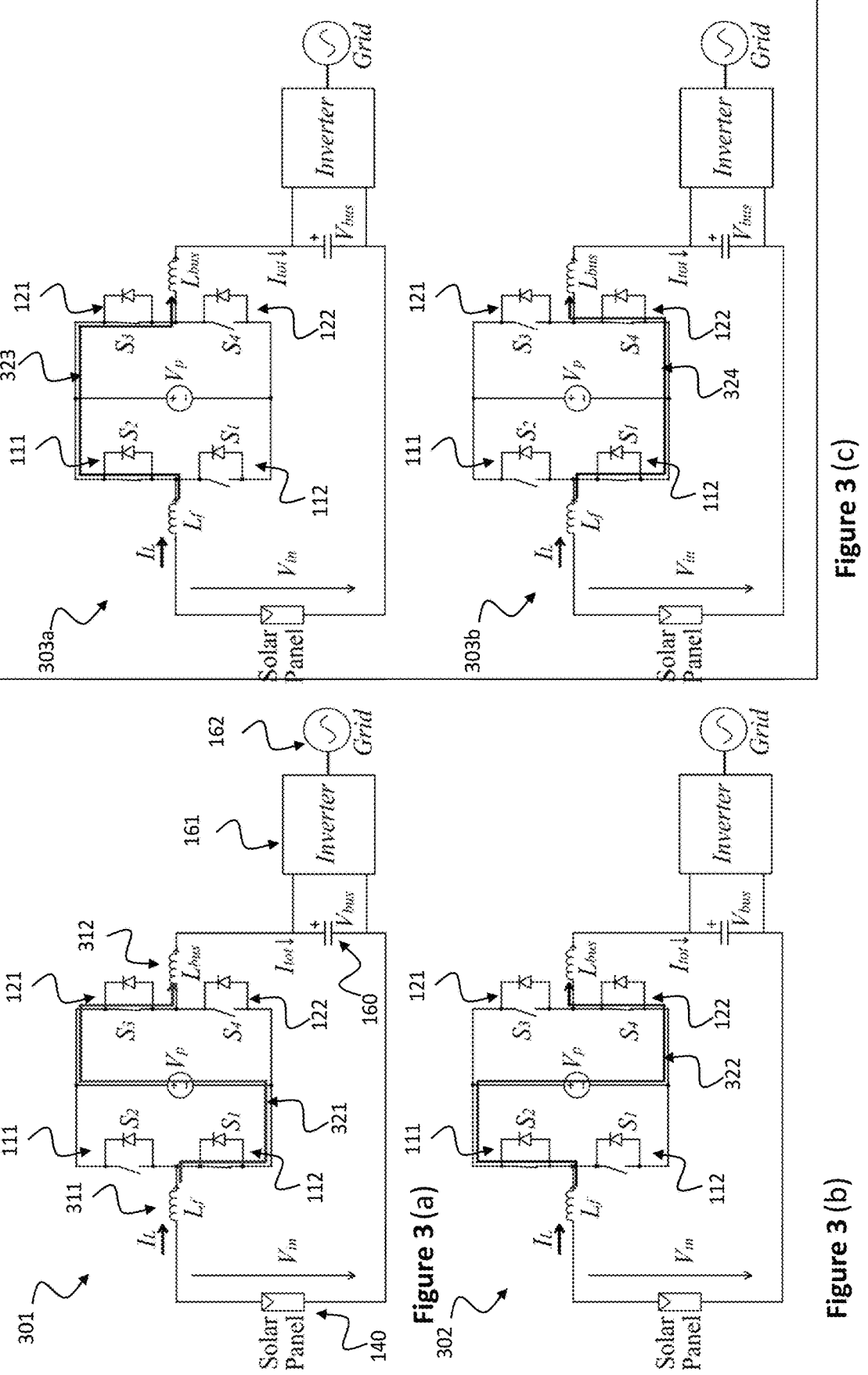
FIG. 3(a) shows an example block diagram illustrating a first current path 301 of a partial power converter according to the disclosure.
FIG. 3(b) shows an example block diagram illustrating a second current path 302 of the partial power converter shown in FIG. 3(a)
FIG. 3(c) shows an example block diagram illustrating a third 303a and fourth 303b current path of the partial power converter shown in FIG. 3(a)

The partial power converter 101 comprises a photovoltaic-side converter 110 per photovoltaic panel 140, 141, 142, 143. Each photovoltaic-side converter 110 comprises at least two switching cells 111, 112. The photovoltaic-side converter 110 is configured to switch the respective direct current IL via a first current path 301 or a second current path 302, e.g. as shown in FIGS. 3(a) and 3b, of the partial power converter 101 by setting the at least two switches 111, 112 to enable the first current path 301 or the second current path 302, respectively.

The partial power converter 101 comprises a bus-side converter 120 comprising at least two switching cells 121, 122 and an inductor 312. The bus-side converter 120 is configured to switch the direct current Itot via the first current path 301 or the second current path 302 of the partial power converter 101 by setting the at least two switches 121, 122 to enable the first current path 301 or the second current path 302, respectively.

The partial power converter 101 comprises an energy storage element 150 connected between the photovoltaic-side converters 110 and the bus-side converter 120. The energy storage element 150 is configured to produce a negative voltage drop Vp across the partial power converter 101 when the photovoltaic-side converter 110 and the bus-side converter 120 are configured to switch the direct current IL via the first current path 301 and to produce a positive voltage drop –Vp across the partial power converter 101 when the photovoltaic-side converter 110 and the bus-side converter 120 are configured to switch the direct current IL via the second current path 302.

The partial power converter 101 comprises a controller 190, configured to control the switching cells 111, 112, 121, 122 of the photovoltaic-side converter 110 and the bus-side converter 120 to switch the direct current IL via the first current path 301 or the second current path 302 of the partial power converter 101 in order to adjust a voltage across the partial power converter 101 according to a power characteristic of the photovoltaic panel 140.

Figure 2B:
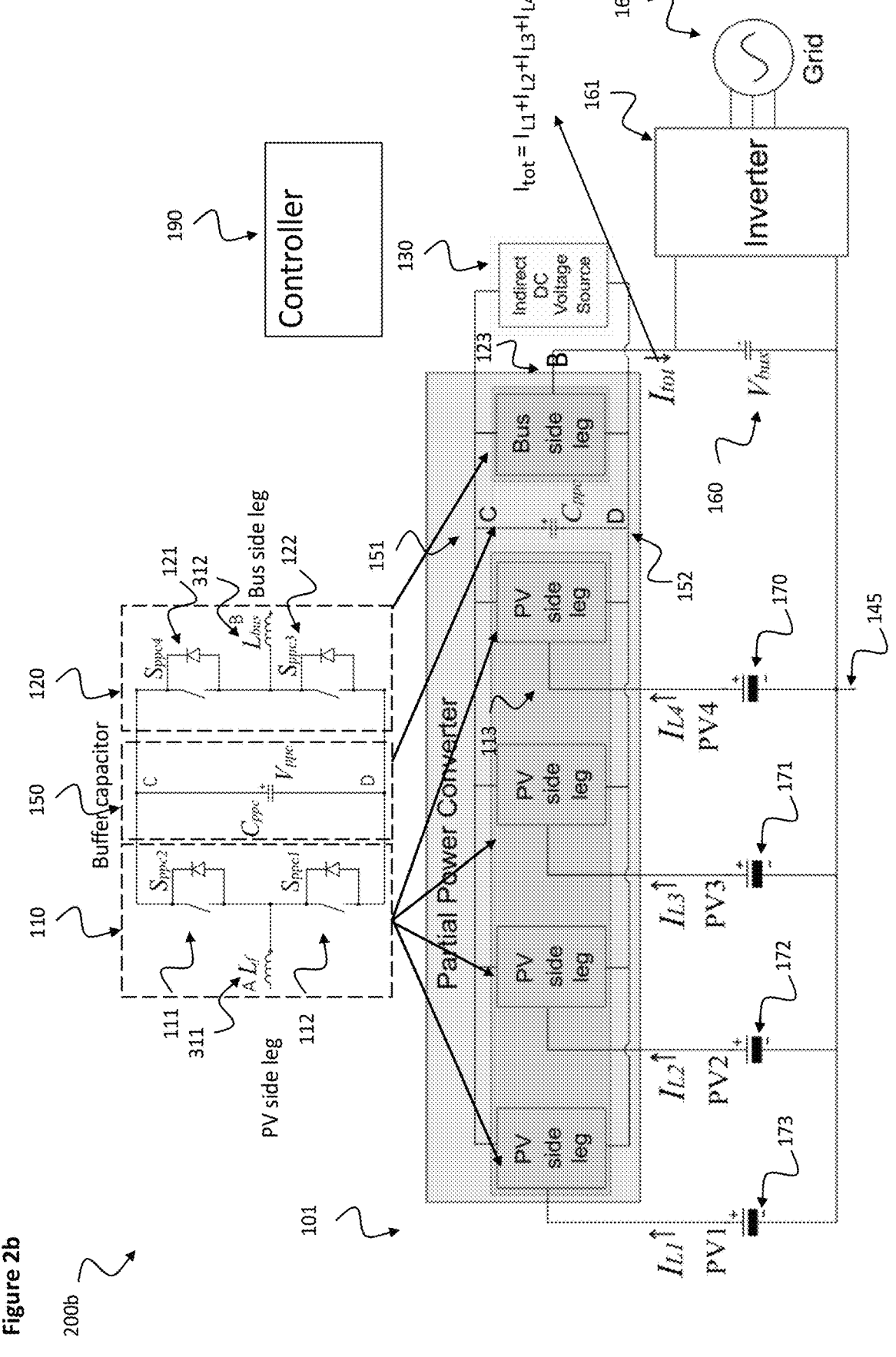
FIG. 2b shows a block diagram illustrating an exemplary partial power conversion system 200b with a partial power converter 101 according to the disclosure connected to a plurality of battery energy storages 170, 171, 172, 173.

FIG. 2b shows a block diagram illustrating an exemplary partial power conversion system 200b with a partial power converter 101 according to the disclosure connected to a plurality of battery energy storages 170, 171, 172, 173.

The partial power conversion system 200b corresponds to the partial power conversion system 200 described above with respect to FIG. 2a. However, in contrast to FIG. 2a, the partial power converter 101 is not connected to multiple photovoltaic panels 140, 141, 142, 143 but to a plurality of battery energy storages 170, 171, 172, 173.

The battery energy storages 170, 171, 172, 173 may be configured to store energy provided by the partial power converter 101.

The third terminals 113 of each photovoltaic-side converter 110 can connect the photovoltaic-side converter 110 to a respective battery energy storage 170, 171, 172, 173. The currents IL1, IL2, IL3, IL4 at the third terminals 113 of each photovoltaic-side converter 110 can flow in both directions. For example, when charging a respective battery energy storage 170, 171, 172, 173, the respective current IL1, IL2, IL3, IL4 can flow from the partial power converter 101 to the respective battery energy storage 170, 171, 172, 173 and when using energy from a respective battery energy storage 170, 171, 172, 173 the respective current IL1, IL2, IL3, IL4 can flow in opposite direction. Each battery energy storage 170, 171, 172, 173 can operate independently from the other ones. The charging level of each battery energy storage 170, 171, 172, 173 can be different or can be equal.

The controller 190 may be configured to adjust the voltage across the partial power converter 101 according to a state of charge of the respective battery energy storage 170, 171, 172, 173. For example, when one of the battery energy storages 170, 171, 172, 173 is at a low charging level, the controller 190 can adjust the voltage across the partial power converter 101 to a high level; while when one of the battery energy storages 170, 171, 172, 173 is at a high charging level, the controller 190 can adjust the voltage across the partial power converter 101 to a low level.

Figure 2C:
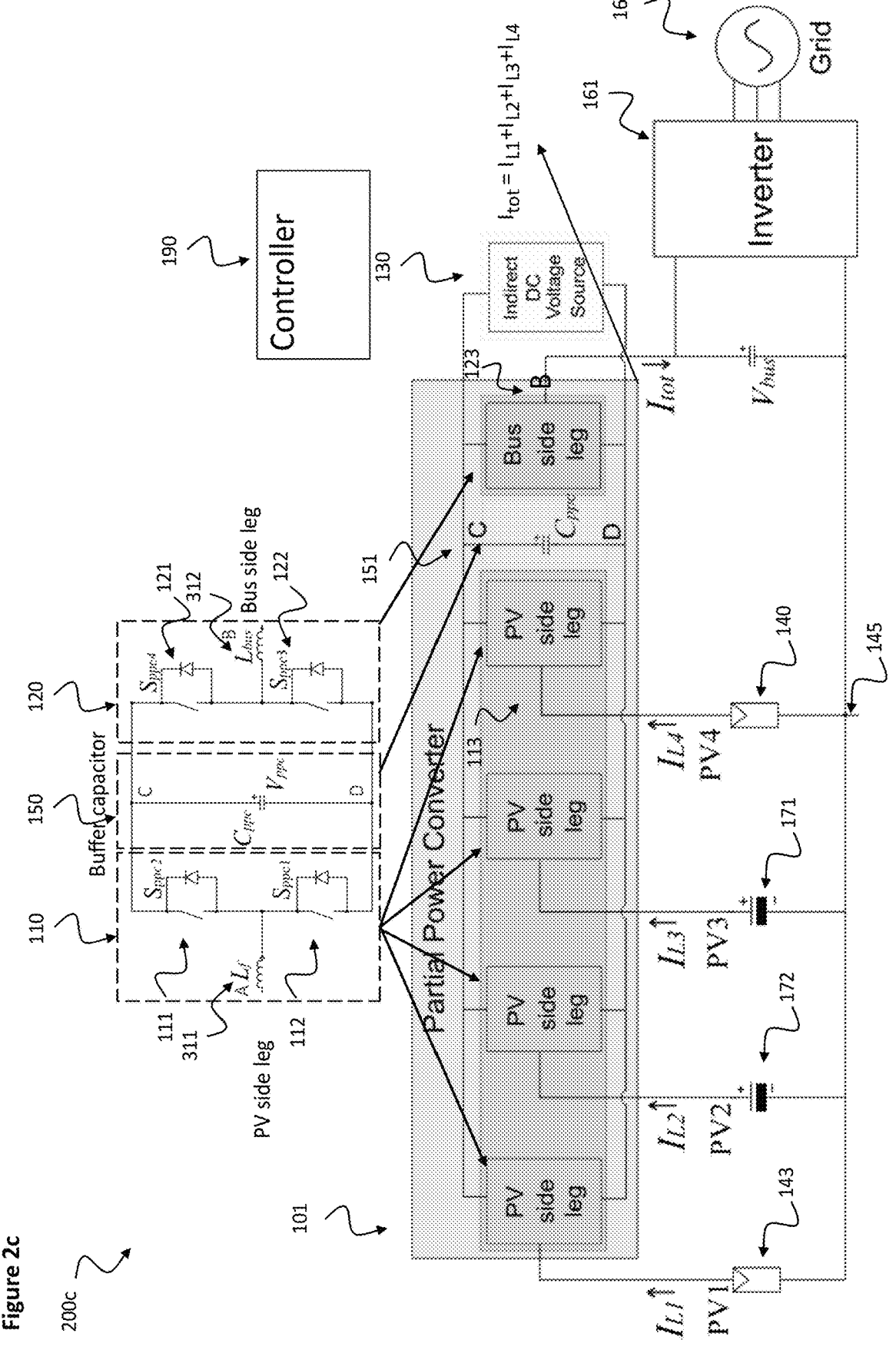
FIG. 2c shows a block diagram illustrating an exemplary partial power conversion system 200c with a partial power converter 101 according to the disclosure connected to multiple solar panels 140, 143 and to multiple battery energy storages 171, 172.

FIG. 2c shows a block diagram illustrating an exemplary partial power conversion system 200c with a partial power converter 101 according to the disclosure connected to multiple solar panels 140, 143 and to multiple battery energy storages 171, 172.

The partial power conversion system 200c may correspond to any of the partial power conversion system 200 described above with respect to FIG. 2a or the partial power conversion system 200b described above with respect to FIG. 2b. However, in contrast to FIG. 2a and FIG. 2b, the partial power converter 101 is not connected to both, multiple photovoltaic panels 140, 143 as well as multiple battery energy storages 171, 172.

The third terminal 113 of a respective photovoltaic-side converter 110 may be configured to connect the partial power converter 101 to both, the photovoltaic panels 140, 143 and to the battery energy storages 171, 172.

The partial power converter 101 may receive photovoltaic energy from the photovoltaic panels 140, 143 and store this photovoltaic energy in the battery energy storages 171, 172 or convert this photovoltaic energy and provide it to the grid 162. Another configuration of the partial power conversion system 200c is that the battery energy storages 171, 172 provide their stored energy to the grid 162. Another configuration of the partial power conversion system 200c is that the grid 162 provides the energy to the partial power converter 101 for charging the battery energy storages 171, 172.

FIG. 3(a) shows a block diagram illustrating a first current path 301 of a partial power converter according to the disclosure. The partial power converter corresponds to the partial power converter 101 described above with respect to FIGS. 1a and 2a. The first current path 301 is arranged between the second node 152, D and the first node 151, C of the partial power converter 101.

The first current path 301 may represent a positive state of the converter 101, where current $I_L$ from solar panel 140 flows through inductor 311 in the PV side leg 110 via switching cell 112 of PV side leg 110. The current $I_L$ then passes the energy storage element 150, e.g. capacitor $C_p$ and flows in the bus side leg 120 via switching cell 121 of bus side leg 120. The current $I_L$ then passes inductor 312 and is then passed as total current $I_{tot}$ to the DC bus 160.

FIG. 3(b) shows a block diagram illustrating a second current path 302 of the partial power converter shown in FIG. 3(a). The partial power converter corresponds to the partial power converter 101 described above with respect to FIGS. 1a and 2a. The second current path 302 is arranged between the first node 151, C and the second node 152, D of the partial power converter 101.

The second current path 302 may represent a negative state of the converter 101, where current $I_L$ from solar panel 140 flows through inductor 311 in the PV side leg 110 via switching cell 111 of PV side leg 110. The current $I_L$ then passes the energy storage element 150, e.g. capacitor $C_p$ and flows in the bus side leg 120 via switching cell 122 of bus side leg 120. The current $I_L$ then passes inductor 312 and is then passed as total current Lot to the DC bus 160.

FIG. 3(c) shows a block diagram illustrating a third 303a and fourth 303b current path of the partial power converter shown in FIG. 3(a). The partial power converter corresponds to the partial power converter 101 described above with respect to FIGS. 1 and 2. The third and fourth current paths 303a, 303b are arranged at the first node 151, C or the second node 152, D, respectively, of the partial power converter 101.

The third current path 303a may represent a bypassing state of the converter 101, where current $I_L$ from solar panel 140 flows through inductor 311 in the PV side leg 110 via switching cell 111 of PV side leg 110. The current $I_L$ then bypasses the energy storage element 150 and flows directly in the bus side leg 120 via switching cell 121 of bus side leg 120. The current $I_L$ then passes inductor 312 and is then passed as total current $I_{tot}$ to the DC bus 160.

The fourth current path 303b may represent another bypassing state of the converter 101, where current $I_L$ from solar panel 140 flows through inductor 311 in the PV side leg 110 via switching cell 112 of PV side leg 110. The current $I_L$ then bypasses the energy storage element 150 and flows directly in the bus side leg 120 via switching cell 122 of bus side leg 120. The current $I_L$ then passes inductor 312 and is then passed as total current Lot to the DC bus 160.

FIGS. 3(a)-3c shows the possible switching states of the partial power converter 101. Based on the status of the switches, the state space equation of the partial power converter 101 can be expressed as $de_L/dt = 1/L(v_{in} - v_{bus} + (2d - 1)v_p)$ where $v_{in}$ is the PV voltage, $v_{bus}$ is bus voltage, and $v_p$ is partial power converter voltage which is controlled by the stiff DC emulator, i.e. the indirect DC voltage source 130. Deriving the DC average equation of partial power converter 101 according to the state space equation, it is possible to see that PV voltage at Vin can be synthesized by the switching operation and voltages of $V_p$ and $V_{bus}$ as $V_{in} = (1-2D)V_p + Vbus$, where D is the duty cycle of the partial power converter 101.

Having the partial converter 101 installed in series, it is possible to have low voltage semiconductor switches to construct the converter 101. These devices may be low voltage MOSFETs, e.g. 150V MOSFETs.

FIG. 4 shows a block diagram illustrating a partial power conversion system 400 according to a first embodiment, applied in a residential solar PV inverter.

The partial power conversion system 400 shows a first possible embodiment for a Solar PV Inverter. In this scenario PV side legs 110 are connected to the PV strings 140, 141, 142, 143 directly and they are sharing one buffer capacitor $C_{ppc}$ 150. The bus side leg 120 is connected to the DC bus 160 between the inverter 161 and this leg delivers power to the bus 160. Both PV side leg 110 and bus side leg 120 may be built with 2-level leg 411, 421 or multi-level leg, e.g. 3-level leg 412, 413, 422, 423. The multi-level legs may be implemented as NPC or flying capacitor circuits as shown in FIG. 4. The stiff DC voltage emulator, i.e. the indirect DC voltage source 130 may manipulate stiff DC condition to the buffer capacitor 150 and conducting partial power sharing ($P_{partial} = \Sigma P_{PVn} - P_{bus}$) between the partial power converter 101 and also makes converter feasible to control.

In this first possible embodiment shown in FIG. 4, the DC emulator 130 comprises a DC/DC converter 131 and a battery 132 to emulate stiff DC link to the buffer capacitor 150.

The Direct Current bus 160 may be connected via an inverter 161, e.g. a DC/AC converter to an electric power distribution network 162.

FIG. 5 shows a block diagram illustrating a partial power conversion system 500 according to a second embodiment, applied in a residential solar PV inverter.

The partial power conversion system 500 shows a second possible embodiment for a Solar PV Inverter. In this scenario PV side legs 110 are connected to the PV strings 140, 141, 142, 143 directly and they are sharing one buffer capacitor $C_{ppc}$ 150. The bus side leg 120 is connected to the DC bus 160 between the inverter 161 and this leg delivers power to the bus 160. Both PV side leg 110 and bus side leg 120 may be built with 2-level leg 411, 421 or multi-level leg, e.g. 3-level leg 412, 413, 422, 423. The multi-level legs may be implemented as NPC or flying capacitor circuits as shown in FIG. 5. The stiff DC voltage emulator, i.e. the indirect DC voltage source 130 may manipulate stiff DC condition to the buffer capacitor 150 and conducting partial power sharing ($P_{partial} = \Sigma P_{PVn} - P_{bus}$) between the partial power converter 101 and also makes converter feasible to control.

In this second possible embodiment shown in FIG. 5, the DC emulator 130 comprises an isolated DC/DC converter 133 and a DC source 134 to emulate stiff DC link to the buffer capacitor 150.

The direct current bus 160 may be connected via an inverter 161, e.g. a DC/AC converter to an electric power distribution network 162.

FIG. 6 shows a block diagram illustrating a partial power conversion system 600 according to a third embodiment, applied in a residential solar PV inverter.

The partial power conversion system 600 shows a third possible embodiment for a Solar PV Inverter. This third embodiment corresponds to the second embodiment shown in FIG. 5 with the following differences:

No DC source 134 is connected to the isolated DC/DC converter 133. Instead, the DC source is implemented by DC bus 160.

All circuit elements in the above embodiments described with respect to FIGS. 1 to 6 may be based on low voltage semiconductor devices such as MOSFETs, e.g. 150V MOS-FETs. They are typically characterized with very low static and dynamic losses, low cost and can be operated at higher switching frequencies.

PV side leg 110, Bus side leg 120 and stiff dc voltage emulator, i.e. indirect DC voltage source 130 can be constructed using either 2-level, 3-level or multilevel topology structure.

Figure 7:
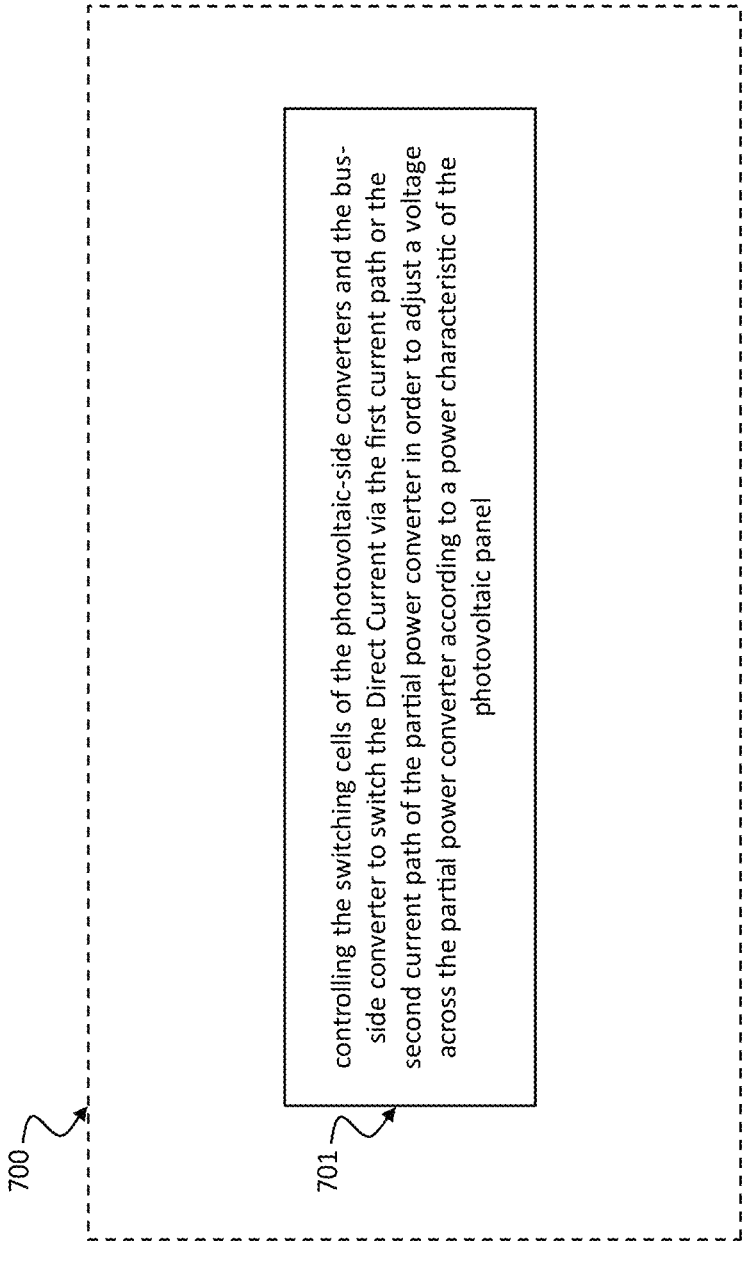
FIG. 7 shows an example schematic diagram illustrating a method 700 for controlling a partial power converter according to the disclosure.

FIG. 7 shows a schematic diagram illustrating a method 700 for controlling a partial power converter according to the disclosure.

The method 700 can be used for controlling a partial power converter 101 as described above with respect to FIGS. 1 to 6. The partial power converter is configured to be connected to one or multiple photovoltaic panels 140, 141, 142, 143, e.g. as shown in FIG. 2, as inputs and a Direct Current output bus 160. The photovoltaic panels 140, 141, 143, 144 are generating a Direct Current $I_{L1}$, $I_{L2}$, $I_{L3}$, $I_{L4}$, as shown in FIG. 2.

As described above with respect to FIGS. 1 and 2, the partial power converter 101 comprises a photovoltaic-side converter 110 per photovoltaic panel 140, 141, 142, 143. Each photovoltaic-side converter 110 comprises at least two switching cells 111, 112. The photovoltaic-side converter 110 is configured to switch the direct current $I_L$ via a first current path 301 or a second current path 302, e.g. as shown in FIG. 3, of the partial power converter 101 by setting the at least two switches 111, 112 to enable the first current path 301 or the second current path 302, respectively.

As described above with respect to FIGS. 1 and 2, the partial power converter 101 comprises a bus-side converter 120 comprising at least two switching cells 121, 122. The bus-side converter 120 is configured to switch the direct current $I_L$ via the first current path 301 or the second current path 302, as shown in FIG. 3, of the partial power converter 101 by setting the at least two switches 121, 122 to enable the first current path 301 or the second current path 302, respectively.

As described above with respect to FIGS. 1 and 2, the partial power converter 101 comprises an energy storage element 150 connected between the photovoltaic-side converter 110 and the bus-side converter 120. The energy storage element 150 is configured to produce a negative voltage drop −Vp across the partial power converter 101 when the photovoltaic-side converter 110 and the bus-side converter 120 are configured to switch the direct current $I_L$ via the first current path 301 and to produce a positive voltage drop Vp across the partial power converter 101 when the photovoltaic-side converter 110 and the bus-side converter 120 are configured to switch the direct current $I_L$ via the second current path 302.

The method 700 comprises: controlling 701 the switching cells 111, 112, 121, 122 of the photovoltaic-side converters 110 and the bus-side converter 120 to switch the direct current IL via the first current path 301 or the second current path 302 of the partial power converter 101 in order to adjust a voltage across the partial power converter 101 according to a power characteristic of the photovoltaic panel 140.

FIG. 8 shows a schematic diagram illustrating a method 800 for controlling a partial power converter according to the disclosure.

The method 800 can be used for controlling a partial power converter 101 as described above with respect to FIGS. 1a to 6. The partial power converter is configured to be connected to one or multiple photovoltaic panels 140, 141, 142, 143, e.g. as shown in FIG. 2, as inputs and a Direct Current output bus 160. The photovoltaic panels 140, 141, 143, 144 are generating a direct current $I_{L1}$, $I_{L2}$, $I_{L3}$, $I_{L4}$, as shown in FIG. 2.

As described above with respect to FIGS. 1a and 2a, the partial power converter 101 comprises a photovoltaic-side converter 110 comprising at least two switching cells 111, 112. The photovoltaic-side converter 110 comprises a first terminal connected to a first node C, a second terminal connected to a second node D and a third terminal 113 that is configured to connect the partial power converter 101 to the at least one photovoltaic panel 140.

As described above with respect to FIGS. 1a and 2a, the partial power converter 101 comprises a bus-side converter 120 comprising at least two switching cells 121, 122. The bus-side converter 120 is configured to switch a total Current Itot of the photovoltaic-side converter 110. The bus-side converter 120 comprises a first terminal connected to the first node C, a second terminal connected to the second node D and a third terminal that is configured to connect the Direct Current output bus 160.

As described above with respect to FIGS. 1a and 2a, partial power converter 101 comprises an energy storage element 150 connected between the photovoltaic-side converter 110 and the bus-side converter 120; and an indirect voltage source 130 configured to regulate the energy storage element 150.

As described above with respect to FIGS. 1a and 2a, the photovoltaic-side converter 110, the bus-side converter 120 and the energy storage element 150 are connected in parallel between the first node C and the second node D of the partial power converter 101.

The method 800 comprises: switching 801 the direct current $I_L$ via a first current path 301 or a second current path 302 of the partial power converter 101 by setting the at least two switching cells 111, 112 of the photovoltaic-side converter 110 to enable the first current path 301 or the second current path 302, respectively.

The method 800 comprises: switching 802 the direct current $I_{tot}$ via the first current path 301 or the second current path 302 of the partial power converter 101 by setting the at least two switching cells 121, 122 of the bus-side converter 120 to enable the first current path 301 or the second current path 302, respectively.

The method 800 comprises: producing 803, by the energy storage element 150, a negative voltage drop −Vp across the partial power converter 101 when the photovoltaic-side converter 110 and the bus-side converter 120 are switching the direct current $I_L$ via the first current path 301 and producing, by the energy storage element 150, a positive voltage drop Vp across the partial power converter 101 when the photovoltaic-side converter 110 and the bus-side converter 120 are switching the Direct Current $I_L$ via the second current path 302.

Figure 9:
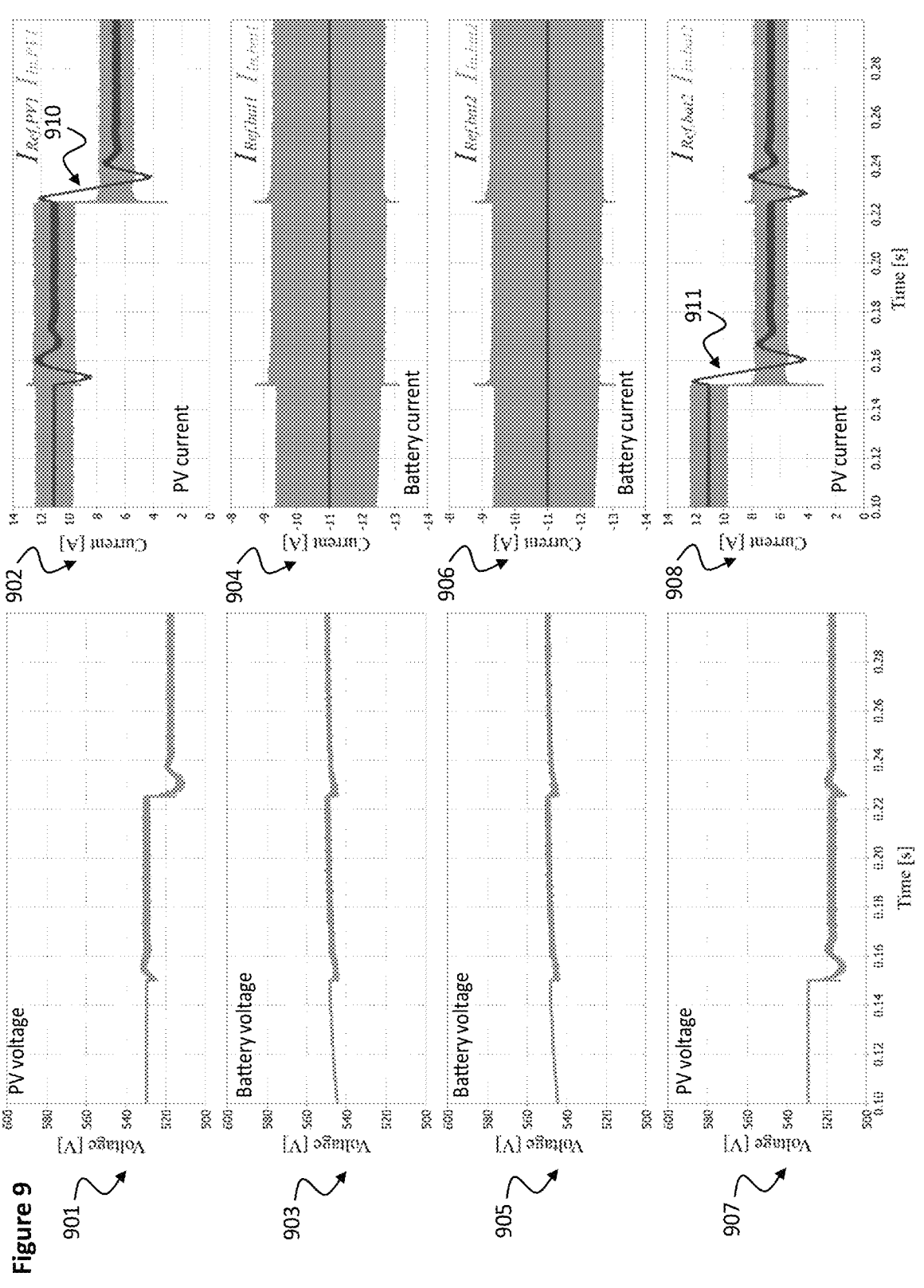
FIG. 9 shows example performance diagrams illustrating photovoltaic voltage and currents as well as battery voltage and current for the partial power conversion system 200c shown in FIG. 2c.

FIG. 9 shows performance diagrams illustrating photovoltaic voltage and currents as well as battery voltage and current for the partial power conversion system 200c shown in FIG. 2c.

Table 1 below depicts the simulation parameter used for this simulation.

TABLE 1

| Parameters and their values applied for the simulation | |
| --- | --- |
| Parameters | Value |
| Bus side voltage | 600 V |
| PPC voltage | 150 V |
| PV side voltage range | 450-700 V |
| Battery voltage | 550 V |

The upper diagrams show the PV voltage 901 and the corresponding current 902 at a first PV panel, e.g., the PV panel PV1, 143, shown in FIG. 2c.

The two following diagrams show the battery voltage 903 and the corresponding current 904 at a first battery energy storage, e.g., the battery energy storage 172, shown in FIG. 2c.

The two following diagrams show the battery voltage 905 and the corresponding current 906 at a second battery energy storage, e.g., the battery energy storage 171, shown in FIG. 2c.

The bottom diagrams show the PV voltage 907 and the corresponding current 908 at a second PV panel, e.g., the PV panel PV4, 140, shown in FIG. 2c.

PV voltage is controlled by the partial power converter 101. The controllable input voltage is limited according to the partial power converter voltage. It can be seen from FIG. 9 that battery current control is stable 910, 911 during change of MPP.

Figure 10:
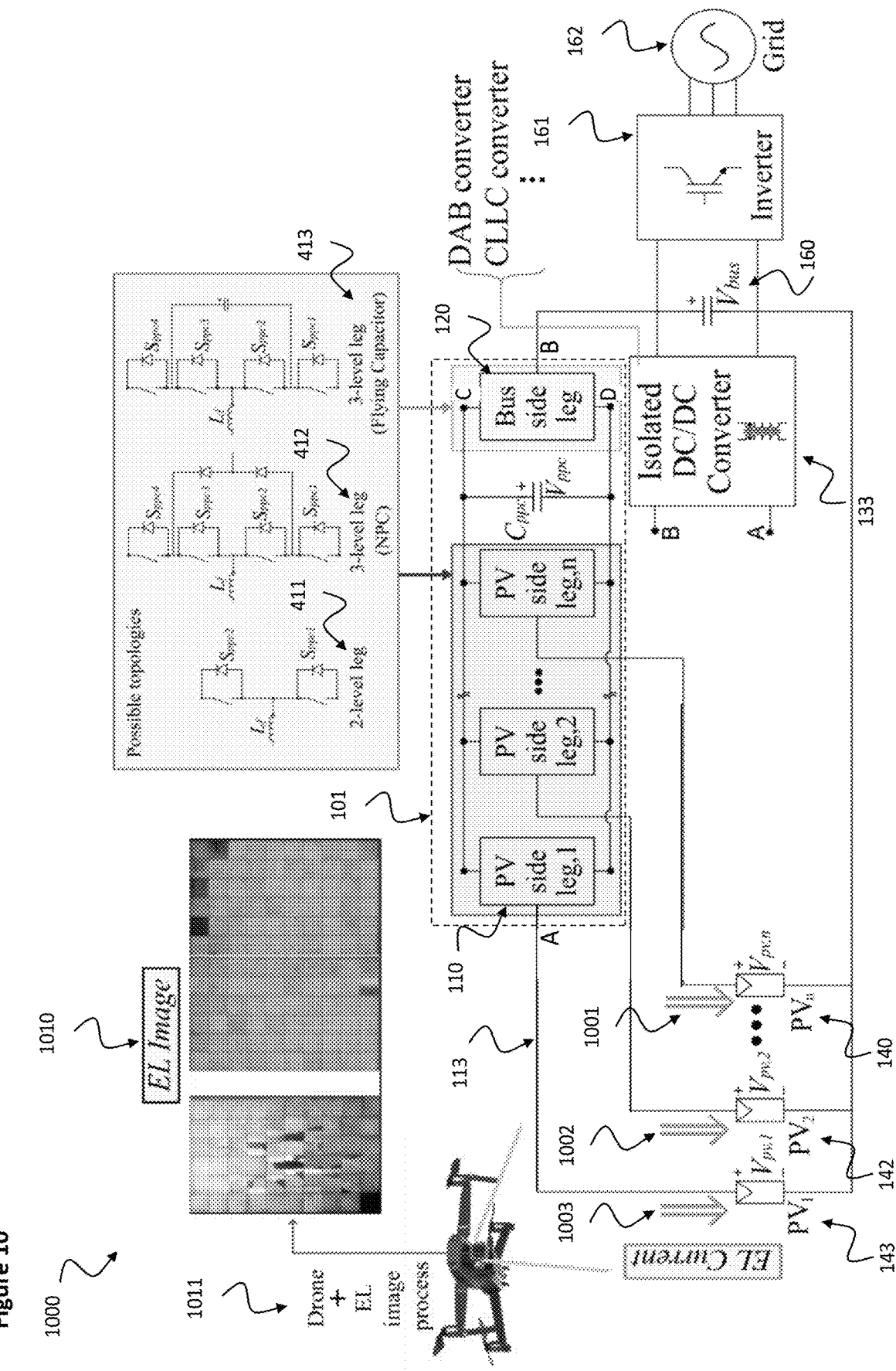
FIG. 10 shows a block diagram illustrating an exemplary partial power conversion system 1000 with a partial power converter 101 according to the disclosure that is configured to provide an electroluminescent current 1003 for recording an electroluminescent image 1010.

FIG. 10 shows a block diagram illustrating an exemplary partial power conversion system 1000 with a partial power converter 101 according to the disclosure that is configured to provide an electroluminescent current 1003 for recording an electroluminescent image 1010.

The partial power conversion system 1000 may correspond to any of the partial power conversion systems 200, 200b, 200c, 400, 500 or 600 described above with respect to FIGS. 2a to 6. Although not shown in FIG. 10, the partial power conversion system 1000 may also comprise one or multiple battery energy storages 171, 172 as shown in FIGS. 2b and 2c.

Bus side leg 120 controls bus side current. PV side legs 110 control PV side current. The partial power converter 101 may inject EL current 1003, 1002, 1001 to the PVs 143, 142, 140. The isolated DC/DC converter 133 may control the partial power converter voltage.

The partial power converter 101 is configured to provide an electroluminescent current 1003, 1002, 1001 to the respective photovoltaic panels 140, 142, 143 for recording an electroluminescent image 1010 of the photovoltaic panels 140, 142, 143, e.g., by a drone 1011. This electroluminescent current 1003, 1002, 1001 may for example recorded at night when no sunshine is disturbing this process. When checking the EL image 1010, the skilled person or an automatic process can detect cracks or fractures in the PV panels.

A drone 1011 with EL sensor may capture image of the whole PV plant. Defects of PVs can be visualized by EL image processing.

The electroluminescent current 1003, 1002, 1001 may particularly be provided by the third terminals 113 of the photovoltaic-side converters 110 of the partial power converter 101.

The current flow direction of the electroluminescent current 1003 can be opposite to the current flow direction of a current (IL) generated by the corresponding photovoltaic panel 143. No additional hardware is needed such as a switch or a diode for controlling the current flow direction.

The third terminal 113 a respective photovoltaic-side converter 110 may be configured to enable a current flow in both directions, e.g., from PV panel to partial power converter for power generation and from partial power converter to PV panel for fault supervision.

The architecture described in FIG. 10 provides the following advantages: The partial power conversion system 1000 allows to check the defects of PVs by visualizing them with EL function. All circuits may be based on low voltage MOSFETs, e.g., 150V. No bulky components are required resulting in high integration potential. The system is scalable for more MPPT strings. The partial power converter 101 provides benefits, particularly for a high number of PVs.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the technology beyond those described herein. While the present technology has been described with reference to one or more particular embodiments, those skilled in the art recognize that many changes may be made thereto without departing from the scope of the present technology. It is therefore to be understood that within the scope of the appended claims and their equivalents, the technology may be practiced otherwise than as described herein.

The invention claimed is:

1. A partial power converter configured for connection to at least one photovoltaic panel as inputs and a direct current output bus, the at least one photovoltaic panel generating a direct current, the partial power converter comprising:
   a photovoltaic-side converter including at least two switching cells, wherein the photovoltaic-side converter includes a first terminal connected to a first node, a second terminal connected to a second node and a third terminal configured to connect the partial power converter to the at least one photovoltaic panel;
   a bus-side converter including at least two switching cells, the bus-side converter configured to switch a total current of the photovoltaic-side converter, wherein the bus-side converter includes a first terminal connected to the first node, a second terminal connected to the second node and a third terminal configured to connect the direct current output bus;
   an energy storage element connected between the photovoltaic-side converter and the bus-side converter; and
   an indirect voltage source configured to regulate the energy storage element,
   wherein the photovoltaic-side converter, the bus-side converter, and the energy storage element are connected in parallel between the first node and the second node of the partial power converter.

2. The partial power converter of claim 1,
   wherein the energy storage element includes a buffer capacitor.

3. The partial power converter of claim 1, wherein
   the first current path is arranged between the second node and the first node of the partial power converter, and
   the second current path is arranged between the first node and the second node of the partial power converter.

4. The partial power converter of claim 1, further comprising:
   at least one additional photovoltaic-side converter including a first terminal connected to the first node, a second terminal connected to the second node and a third terminal configured for connection to at least one additional photovoltaic panel.

5. The partial power converter of claim 1, wherein
   the switching elements of the photovoltaic-side converter are arranged to form a 2-level leg or a multilevel leg.

6. The partial power converter of claim 1, wherein
   the switching elements of the bus-side converter are arranged to form a 2-level leg or a multilevel leg.

7. The partial power converter of claim 1, wherein
   the photovoltaic-side converter includes an inductor configured to receive the direct current from the photovoltaic panel.

8. The partial power converter of claim 1, further comprising:
   a controller, wherein
   the controller is configured to control the switching cells of the photovoltaic-side converter and the bus-side converter to adjust the voltage across the partial power converter based on a duty cycle of the partial power converter.

9. The partial power converter of claim 8, wherein
   the controller is configured to adjust the voltage across the partial power converter to a value of (1−2D) Vp in order to synthesize a voltage (Vin) generated by the photovoltaic panel according to the equation Vin=(1−2D)Vp+Vbus, and Vin is the voltage generated by the photovoltaic panel, Vp is the voltage across the energy storage element, Vbus is the voltage across the DC bus, and D is the duty cycle of the partial power converter.

10. The partial power converter of claim 8, wherein
   the controller is configured to adjust the voltage across the partial power converter according to a Maximum Power Point Tracking (MPPT) characteristic of the photovoltaic panel.

11. The partial power converter of claim 9, wherein
   the controller is configured to adjust the voltage across the partial power converter according to a Maximum Power Point Tracking (MPPT) characteristic of the photovoltaic panel.

12. The partial power converter of claim 1, wherein
   the third terminal of the photovoltaic-side converter is configured to connect the partial power converter to at least one battery energy storage.

13. The partial power converter of claim 12, wherein
   the controller is configured to adjust the voltage across the partial power converter according to a state of charge of the at least one battery energy storage.

14. The partial power converter of claim 4, wherein
   the third terminal of the at least one additional photovoltaic-side converter is configured to connect the partial power converter to either the at least one additional photovoltaic panel or to at least one additional battery energy storage or to both.

15. The partial power converter of claim 1, wherein
   the third terminal of the photovoltaic-side converter is configured to provide an electroluminescent current to the at least one photovoltaic panel for recording an electroluminescent image of the at least one photovoltaic panel.

16. The partial power converter of claim 15, wherein
   the third terminal of the photovoltaic-side converter is configured to enable a current flow in both directions.

17. A partial power converter configured for connection to one or multiple photovoltaic panels as inputs and a direct current output bus, the photovoltaic panels generating a direct current, the partial power converter comprising:
   a photovoltaic-side converter per photovoltaic panel, each photovoltaic-side converter including at least two switching cells, the photovoltaic-side converter configured to switch the direct current via a first current path or a second current path of the partial power converter by setting the at least two switches to enable the first current path or the second current path, respectively;
   a bus-side converter including at least two switching cells, the bus-side converter configured to switch the direct current via the first current path or the second current path of the partial power converter by setting the at least two switches to enable the first current path or the second current path, respectively;
   an energy storage element connected between the photovoltaic-side converters and the bus-side converter, wherein the energy storage element is configured to produce a negative voltage drop across the partial power converter when the photovoltaic-side converter and the bus-side converter are configured to switch the direct current via the first current path, and to produce a positive voltage drop across the partial power converter when the photovoltaic-side converter and the bus-side converter are configured to switch the direct current via the second current path; and
   a controller configured to control the switching cells of the photovoltaic-side converter and the bus-side converter to switch the direct current via the first current path or the second current path of the partial power converter in order to adjust a voltage across the partial power converter according to a power characteristic of the photovoltaic panel.

18. A method for controlling a partial power converter, the partial power converter configured for connection to one or multiple photovoltaic panels as inputs and a direct current output bus, the photovoltaic panels generating a direct current, the partial power converter including:

a photovoltaic-side converter per photovoltaic panel, each photovoltaic-side converter including at least two switching cells, the photovoltaic-side converter configured to switch the direct current via a first current path or a second current path of the partial power converter by setting the at least two switches to enable the first current path or the second current path, respectively;

a bus-side converter including at least two switching cells, the bus-side converter configured to switch the direct current via the first current path or the second current path of the partial power converter by setting the at least two switches to enable the first current path or the second current path, respectively;

an energy storage element connected between the photovoltaic-side converter and the bus-side converter, wherein the energy storage element is configured to produce a negative voltage drop across the partial power converter when the photovoltaic-side converter and the bus-side converter are configured to switch the direct current via the first current path, and to produce a positive voltage drop across the partial power converter when the photovoltaic-side converter and the bus-side converter are configured to switch the direct current via the second current path, the method comprising:

controlling the switching cells of the photovoltaic-side converters and the bus-side converter to switch the direct current via the first current path or the second current path of the partial power converter in order to adjust a voltage across the partial power converter according to a power characteristic of the photovoltaic panel.

* * * * *